(12) United States Patent
Kim et al.

(10) Patent No.: US 11,997,383 B2
(45) Date of Patent: May 28, 2024

(54) CAMERA MODULE EXTRACTING DISTANCE INFORMATION BASED ON A TIME-OF-FLIGHT METHOD

(71) Applicant: LG INNOTEK CO., LTD., Seoul (KR)

(72) Inventors: Seok Hyun Kim, Seoul (KR); Eun Song Kim, Seoul (KR); Kang Yeol Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 246 days.

(21) Appl. No.: 17/595,890

(22) PCT Filed: May 26, 2020

(86) PCT No.: PCT/KR2020/006799
§ 371 (c)(1),
(2) Date: Nov. 29, 2021

(87) PCT Pub. No.: WO2020/242177
PCT Pub. Date: Dec. 3, 2020

(65) Prior Publication Data
US 2022/0321789 A1    Oct. 6, 2022

(30) Foreign Application Priority Data

May 27, 2019    (KR) .......................... 10-2019-0061837

(51) Int. Cl.
*H04N 5/335* (2011.01)
*G01S 17/10* (2020.01)
(Continued)

(52) U.S. Cl.
CPC ........... *H04N 23/672* (2023.01); *G01S 17/10* (2013.01); *G01S 17/894* (2020.01)

(58) Field of Classification Search
CPC ............................ H04N 23/672; G01S 17/894
See application file for complete search history.

(56) References Cited

U.S. PATENT DOCUMENTS

2012/0154537 A1* 6/2012 Chang ..................... G01S 17/06
                                                               348/46
2014/0139631 A1    5/2014 Mark et al.
(Continued)

FOREIGN PATENT DOCUMENTS

KR    10-2012-0069833 A    6/2012
KR      10-1861765 B1      5/2018
(Continued)

OTHER PUBLICATIONS

International Search Report dated Aug. 27, 2020 in International Application No. PCT/KR2020/006799.

*Primary Examiner* — Gary C Vieaux
(74) *Attorney, Agent, or Firm* — SALIWANCHIK, LLOYD & EISENSCHENK

(57) ABSTRACT

According to an embodiment of the present invention, disclosed is a camera module comprising: a light output unit for outputting an optical signal to an object; a sensor for receiving an optical signal reflected from the object; and a control unit for acquiring distance information about the object by using the phase difference of the received optical signal, wherein the sensor includes a non-extraction area from which the phase different is not extracted and an extraction area from which the phase difference is extracted and the control unit stops timing control for the received optical signal in the non-extraction area.

8 Claims, 23 Drawing Sheets

(51) Int. Cl.
*H04N 23/67* (2023.01)
*G01S 17/894* (2020.01)

(56) References Cited

U.S. PATENT DOCUMENTS

2016/0349369 A1* 12/2016 Lee .................... G06T 7/586
2017/0242102 A1* 8/2017 Dussan ................ G01S 17/10

FOREIGN PATENT DOCUMENTS

KR  10-2018-0114147 A  10/2018
KR  10-1925028 B1  12/2018

* cited by examiner

CAMERA MODULE EXTRACTING DISTANCE INFORMATION BASED ON A TIME-OF-FLIGHT METHOD

CROSS-REFERENCE TO RELATED APPLICATIONS

This application is the U.S. national stage application of International Patent Application No. PCT/KR2020/006799, filed May 26, 2020, which claims the benefit under 35 U.S.C. § 119 of Korean Application No. 10-2019-0061837, filed May 27, 2019, the disclosures of each of which are incorporated herein by reference in their entirety.

TECHNICAL FIELD

The present invention relates to a camera module for extracting distance information.

BACKGROUND ART

Three-dimensional (3D) content is being applied in many fields such as education, manufacturing, and autonomous driving fields as well as game and culture fields, and distance information (depth map) is required to acquire 3D content. Distance information is information that indicates a spatial distance and refers to perspective information of a point with respect to another point in a two-dimensional image.

As methods of acquiring distance information, a method of projecting infrared (IR) structured light onto an object, a method using a stereo camera, a time-of-flight (ToF) method, and the like are being used. According to the ToF method, a distance to an object is calculated using information about light that is emitted and reflected. The greatest advantage of the ToF method is that distance information about a 3D space is quickly provided in real time. In addition, accurate distance information may be acquired without applying a separate algorithm or performing hardware correction by a user. Furthermore, accurate distance information may be acquired even when a very close subject is measured or a moving subject is measured.

However, there are limitations in that a processing speed is high in processing distance information and power consumption is high. In addition, there is a problem in that accuracy is lowered when a distance from an object is increased.

DISCLOSURE

Technical Problem

The present invention is directed to providing a camera module which extracts distance information using a time-of-flight (ToF) method.

The present invention is directed to providing a camera module which generates three-dimensional content with high power efficiency through distance information of a partial area which is acquired from an image sensor.

The present invention is directed to providing a camera module capable of easily generating a distance map even when a distance is increased.

According to an exemplary embodiment of the present invention, a camera module includes a light output unit configured to output an optical signal to an object, a sensor configured to receive an optical signal reflected from the object, and a control unit configured to acquire distance information of the object using a phase difference of the received optical signal, wherein the sensor includes a non-extraction area in which the phase difference is not extracted and an extraction area in which the phase difference is extracted, and the control unit stops timing control of the received optical signal in the non-extraction area.

The sensor may synthesize the received optical signal with a plurality of reference signals having different phases to generate a plurality of electrical signals, and in the non-extraction area, two or more of the plurality of electrical signals corresponding to the plurality of reference signals may not be generated.

The plurality of reference signals may be sequentially shifted by a predetermined phase.

In the non-extraction area, sums of the electrical signals corresponding to the reference signals having a phase difference of 180° may be different among the plurality of electrical signals.

In the non-extraction area, a plurality of electrical signals may have a magnitude that is less than or equal to a preset magnitude.

The sensor may include a plurality of pixels, the phase difference may be a phase difference between the optical signal and the reflected optical signal, and the control unit may block switching control for controlling a light reception time of the plurality of pixels.

The sensor may include a first sensing area configured to receive a first signal having a peak wavelength in a first wavelength band, and a second sensing area configured to receive a second signal having a peak wavelength in a second wavelength band, and the second wavelength band may be different from the first wavelength band.

The second sensing area may include the extraction area and the non-extraction area.

The camera module may further include a filter disposed between the object and the sensor, wherein the filter includes a first filter area of which a pass band is the first wavelength band, and a second filter area of which a pass band is a second wavelength band that is different from the first wavelength band.

The second sensing area may be provided as a plurality of second sensing areas, and the plurality of second sensing areas may be disposed to be spaced apart from each other.

The second sensing areas may have the same distance in a row direction or a column direction.

Each of the second sensing areas may include a plurality of pixels of which at least portions are disposed to be in contact with each other.

The light output unit may include a light collection unit configured to output the optical signal in the form of a plurality of arrays.

Advantageous Effects

According to exemplary embodiments of the present invention, three-dimensional (3D) content can be easily output through distance information of a partial area of an image which is acquired from an image sensor.

In addition, even when a distance is increased, the accuracy of distance recognition can be improved.

Furthermore, power consumption can be reduced when distance information is generated.

In addition, 3D content reflecting distance information with improved accuracy can be provided.

MODES OF THE INVENTION

Figure 1:
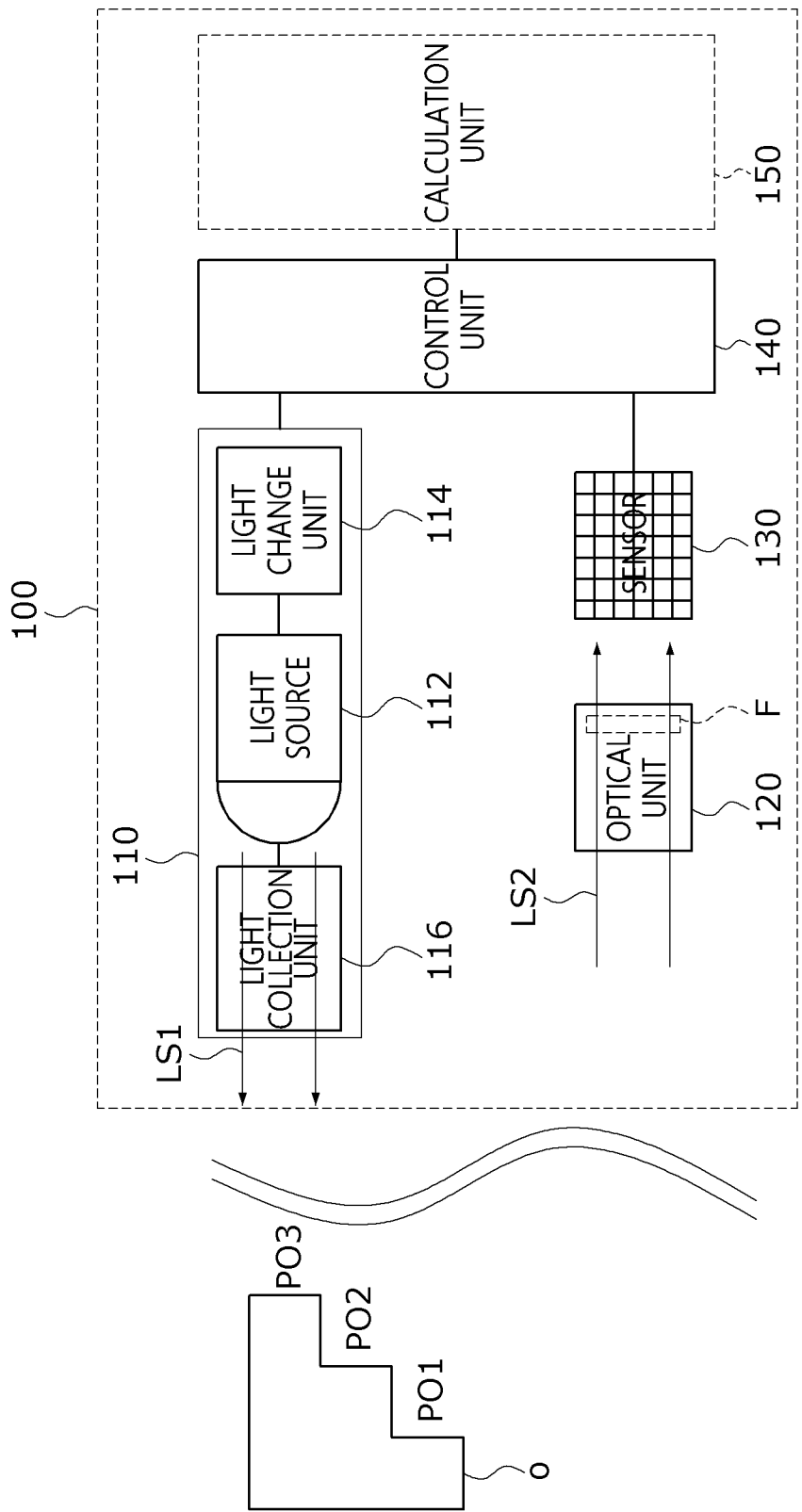
FIG. 1 shows conceptual diagrams illustrating a camera module according to an exemplary embodiment.

Hereinafter, exemplary embodiments of the present invention will be described in detail with reference to the accompanying drawings.

However, the technical spirit of the present invention is not limited to some exemplary embodiments disclosed below but can be implemented in various different forms. Without departing from the technical spirit of the present invention, one or more of components may be selectively combined and substituted to be used between the exemplary embodiments.

Also, unless defined otherwise, terms (including technical and scientific terms) used herein may be interpreted as having the same meaning as commonly understood by one of ordinary skill in the art to which the present invention belongs. General terms like those defined in a dictionary may be interpreted in consideration of the contextual meaning of the related technology.

Furthermore, the terms used herein are intended to illustrate exemplary embodiments but are not intended to limit the present invention.

In the present specification, the terms expressed in the singular form may include the plural form unless otherwise specified. When "at least one (or one or more) of A, B, and C" is expressed, it may include one or more of all possible combinations of A, B, and C.

In addition, terms such as "first," "second," "A," "B," "(a)," and "(b)" may be used herein to describe components of the exemplary embodiments of the present invention.

Each of the terms is not used to define an essence, order, or sequence of a corresponding component but used merely to distinguish the corresponding component from other components.

In a case in which one component is described as being "connected," "coupled," or "joined" to another component, such a description may include both a case in which one component is "connected," "coupled," and "joined" directly to another component and a case in which one component is "connected," "coupled," and "joined" to another component with still another component disposed between one component and another component.

In addition, in a case in which any one component is described as being formed or disposed "on (or under)" another component, such a description includes both a case in which the two components are formed to be in direct contact with each other and a case in which the two components are in indirect contact with each other such that one or more other components are interposed between the two components. In addition, in a case in which one component is described as being formed "on (or under)" another component, such a description may include a case in which the one component is formed at an upper side or a lower side with respect to another component.

A camera module according to an exemplary embodiment to be described below may be used as an optical device or a part of the optical device. First, the optical device may include any one of a cellular phone, a mobile phone, a smartphone, a portable smart device, a digital camera, a laptop computer, a digital broadcasting terminal, a personal digital assistant (PDA), a portable multimedia player (PMP), and a navigation device. However, types of the optical device are not limited thereto, and any device for capturing an image or video may be included in the optical device.

The optical device may include a main body. The main body may have a bar shape. Alternatively, the main body may have one of various structures such as a slide type, a folder type, a swing type, and a swivel type in which two or more sub-bodies are coupled to be relatively movable. The main body may include a case (casing, housing, or cover) forming an exterior. For example, the main body may include a front case and a rear case. Various electronic components of the optical device may be included in a space formed between the front case and the rear case.

The optical device may include a display. The display may be disposed on one surface of the main body of the optical device. The display may output an image. The display may output an image captured by a camera.

The optical device may include a camera. The camera may include a time-of-flight (ToF) camera module. The ToF camera module may be disposed on a front surface of the main body of the optical device. In this case, the ToF camera module may be used for various types of biometric recognition such as face recognition, iris recognition, and vein recognition of a user for security authentication of the optical device.

FIG. 1 shows conceptual diagrams illustrating a camera module according to an exemplary embodiment.

Referring to FIG. 1, a camera module 100 according to the exemplary embodiment may include a light output unit 110, an optical unit 120, a sensor 130, a control unit 140, and a calculation unit 150.

The light output unit 110 may generate and emit light toward an object O in a desired signal form. Specifically, the light output unit 110 may be a light-emitting module, a light-emitting unit, a light-emitting assembly, or a light-emitting device. The light output unit 110 may generate an optical signal and then emit the generated optical signal onto the object. In this case, the light output unit 110 may generate and output an optical signal in the form of a pulse wave or a continuous wave. The continuous wave may be in the form of a sinusoid wave or a squared wave.

When the light output unit 110 generates an optical signal in the form of a pulse wave or a continuous wave, the camera module 100 may use a phase difference or a time difference between the optical signal output from the light output unit 110 and an input optical signal reflected from the object and then input to the camera module 100. In the present specification, output light LS1 may refer to light that is output from the light output unit 110 and incident on the object, and input light LS2 may refer to light that is input to the camera module 100 when output light is output from the light output unit 110, reaches the object, and then is reflected from the object. From the point of view of the object, the output light LS1 may be incident light, and the input light LS2 may be reflected light.

The light output unit 110 emits the generated optical signal onto the object for a predetermined integration time. Here, the integration time refers to one frame period. In order to generate a plurality of frames, a set integration time is repeated. For example, when the camera module 100 photographs the object at 20 frames per second (FPS), an integration time is $\frac{1}{20}$ [sec]. In order to generate 100 frames, an integration time may be repeated 100 times.

The light output unit 110 may generate not only an output optical signal having a predetermined frequency but also a plurality of optical signals having different frequencies. In addition, the light output unit 110 may sequentially and repeatedly output a plurality of optical signals having different frequencies. Alternatively, the light output unit 110 may simultaneously output a plurality of optical signals having different frequencies.

For such an operation, in an exemplary embodiment, the light output unit 110 may include a light source 112, a light change unit 114, and a light collection unit 116.

First, the light source 112 may generate light. The light generated by the light source 112 may be infrared light having a wavelength of 770 nm to 3,000 nm or may be visible light having a wavelength of 380 nm to 770 nm. The light source 112 may use a light-emitting diode (LED) and may have a form in which a plurality of LEDs are arranged according to a certain pattern. In addition, the light source 112 may also include an organic light-emitting diode (OLED) or a laser diode (LD). Alternatively, the light source 112 may also be a vertical cavity surface emitting laser (VCSEL). The VCSEL may be one of laser diodes which convert an electrical signal into an optical signal and may use a signal having a wavelength of about 800 nm to 1,000 nm, for example, a wavelength of about 850 nm or about 940 nm.

The light source 112 is repeatedly turned on/off at a certain time interval to generate an optical signal in the form of a pulse wave or a continuous wave. The certain time interval may be a frequency of an optical signal. Turning-on/off of the light source 112 may be controlled by the light change unit 114.

The light change unit 114 controls turning-on/off of the light source 112 and controls the light source 112 to generate an optical signal in the form of a continuous wave or a pulse wave. The light change unit 114 may control the light source 112 to generate an optical signal in the form of a continuous wave or a pulse wave through frequency modulation, pulse modulation, or the like.

The light collection unit 116 may change a light path such that light generated from the light source 112 has an array spot. For example, the light collection unit 116 may include an imaging lens, a micro lens array, or a diffractive optical element (DOE). Due to such a configuration, light emitted toward the object O from the camera module 100 may have a plurality of array spots. Thus, even when a distance between the camera module 100 and the object O is increased, light emitted from the camera module 100 may easily reach the object O due to being collected. Accordingly, the camera module 100 according to the exemplary embodiment may enable longer-distance light transmission. In this case, the number of the array spots can be variously set, and the configuration and effects of the light collection unit 116 will be described in detail below.

Meanwhile, the optical unit 120 may include at least one lens. The optical unit 120 may collect an input optical signal reflected from the object through at least one lens to transmit the collected optical signal to the sensor 130. At least one lens of the optical unit 120 may include a solid lens. In addition, at least one lens may include a variable lens. The variable lens may be a focus-variable lens. In addition, the variable lens may be a focus-adjustable lens. Furthermore, the variable lens may be at least one of a liquid lens, a polymer lens, a liquid crystal lens, a voice coil motor (VCM) type, and a shape-memory alloy (SMA) type. The liquid lens may include a liquid lens including one type of liquid and a liquid lens including two types of liquids. In the liquid lens including one type of liquid, a focus may be varied by adjusting a membrane disposed at a position corresponding to the liquid, and for example, the focus may be varied by pressing the membrane with an electromagnetic force of a magnet and a coil. The liquid lens including two types of liquids may include a conductive liquid and a non-conductive liquid, and an interface formed between the conductive liquid and the non-conductive liquid may be adjusted using a voltage applied to the liquid lens. In the polymer lens, a focus may be varied by controlling a polymer material through a piezo-driver or the like. In the liquid crystal lens, a focus may be varied by controlling a liquid crystal with an electromagnetic force. In the VCM type, a focus may be varied by controlling a solid lens or a lens assembly including a solid lens through an electromagnetic force between a magnet and a coil. In the SMA type, a focus may be varied by controlling a solid lens or a lens assembly including a solid lens using a shape memory alloy. In addition, the optical unit 120 may include an optical plate. The optical plate may be a light transmitting plate.

In addition, the optical unit 120 may include a filter F that transmits light in a specific wavelength range. In an exemplary embodiment, the filter F of the optical unit 120 may transmit only light in a preset wavelength region and may block light other than light in the preset wavelength region. In this case, the filter F may allow light in an infrared (IR)

region to partially pass therethrough. For example, the filter F may include an IR band filter that allows light having a wavelength of 780 nm to 1,000 nm to partially pass therethrough. A detailed description thereof will be provided below.

The sensor 130 may generate an electrical signal using an input optical signal that is collected through the optical unit 120. In an exemplary embodiment, the sensor 130 may absorb an input optical signal in synchronization with an on/off period of the light output unit 110. Specifically, the sensor 130 may absorb light in each of an in-phase and an out-phase with an optical signal output from the light output unit 110.

In addition, the sensor 130 may generate an electrical signal corresponding to each reference signal using a plurality of reference signals having different phases. For example, the electrical signal may be a signal obtained by mixing each reference signal and input light, and the mixing may include convolution, multiplication, or the like. In addition, a frequency of the reference signal may be set to correspond to a frequency of an optical signal output from the light output unit 110. In an exemplary embodiment, the frequency of the reference signal may be the same as the frequency of the optical signal of the light output unit 110.

As described above, when the light output unit 110 generates an optical signal with a plurality of frequencies, the sensor 130 may generate an electrical signal using a plurality of reference signals corresponding to each frequency. The electrical signal may include information about an amount of electric charge or a voltage which corresponds to each reference signal. In addition, the electric signal may be calculated for each pixel.

The control unit 140 may control the optical unit 120 to shift an optical path of an input optical signal. Due to such a configuration, as will be described below, it is possible to output a plurality of pieces of image data for extracting a high-resolution distance image. A detailed description thereof will be provided below.

In addition, the calculation unit 150 may use the electrical signal received from the sensor 130 and combine the plurality of pieces of image data extracted from the control unit 140 to calculate distance information having high resolution that is higher than that of the image data. In addition, the calculation unit 150 may be disposed in an optical device including the camera module or in the camera module 100 as shown to perform calculation. Hereinafter, descriptions will be provided based on the calculation unit 150 being disposed in the camera module 100.

The calculation unit 150 may receive information detected by the sensor 130 from the camera module 100 to perform calculation thereon. That is, the calculation unit 150 may receive a plurality of pieces of low-resolution information using the electrical signal received from the sensor 130 and generate high-resolution distance information using the plurality of pieces of low-resolution information. For example, the high-resolution distance information may be generated by rearranging the plurality of pieces of low-resolution information.

In this case, the calculation unit 150 may calculate a distance between the object and the camera module 100 using a time difference between an optical signal output from the light output unit and an optical signal received by the sensor or using a plurality of pieces of information acquired during a plurality of integration times of the sensor for which an effective area of the sensor is exposed in different phases.

Figure 2:
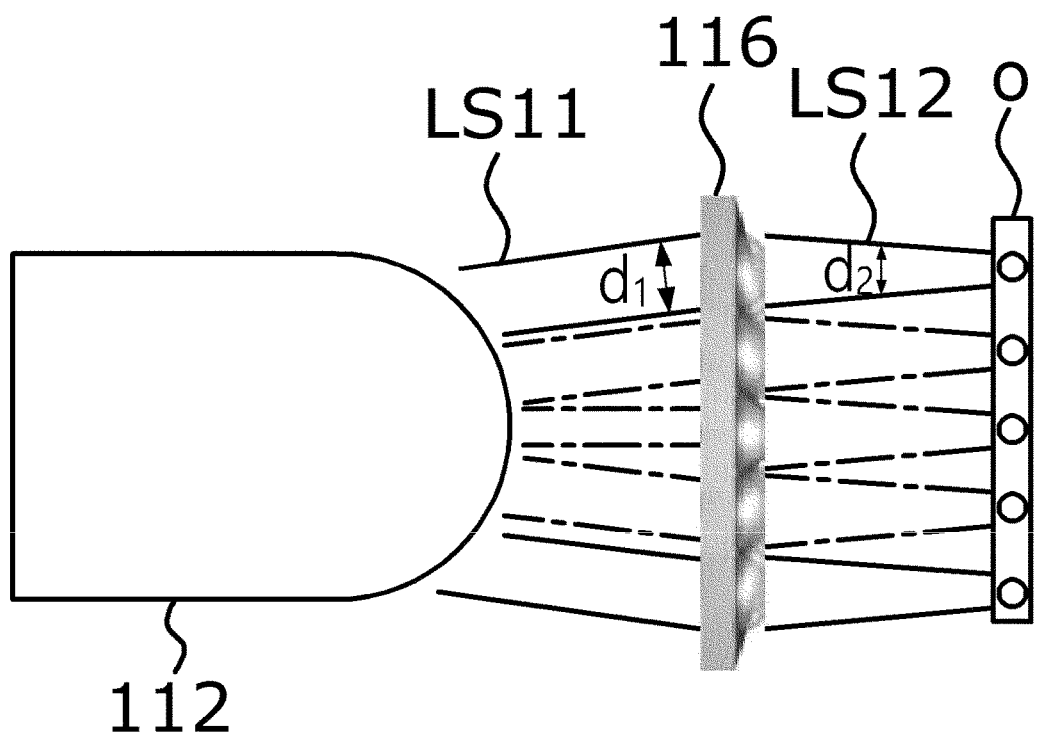
FIG. 2 is a diagram illustrating a light output unit according to an exemplary embodiment.
Figure 3:
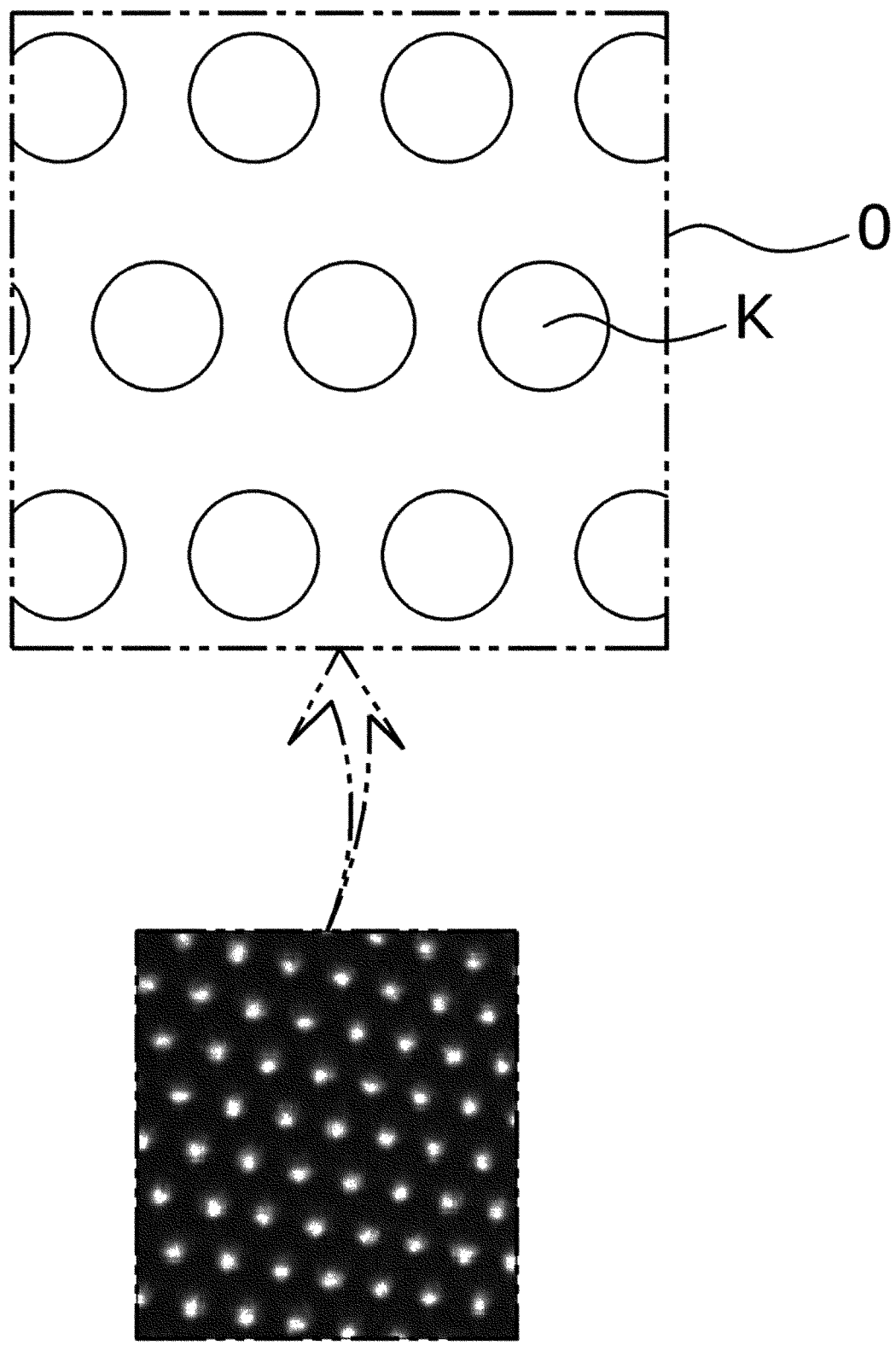
FIG. 3 shows diagrams illustrating one surface of an object in FIG. 2.
Figure 4A:
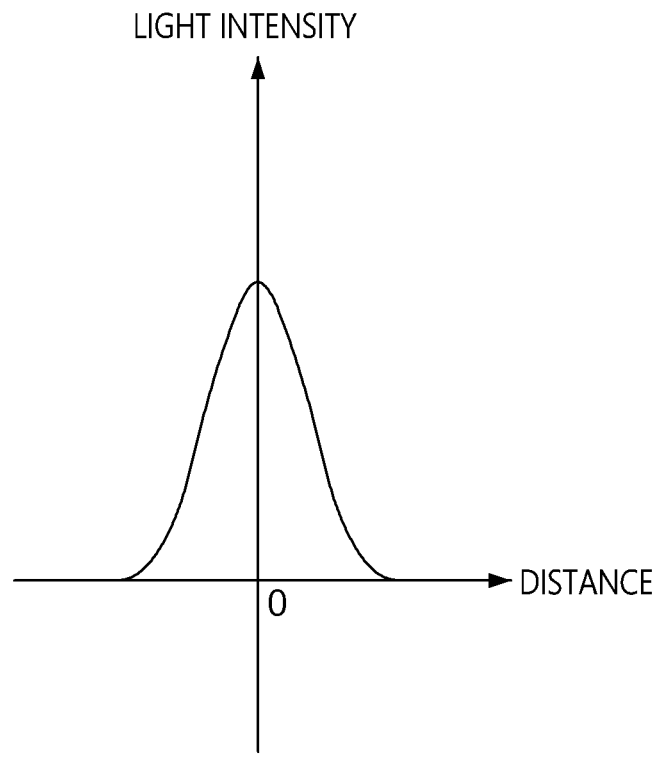
FIGS. 4A and 4B show graphs for describing an effect of light intensity according to a distance of a light output unit according to an exemplary embodiment.
Figure 4B:
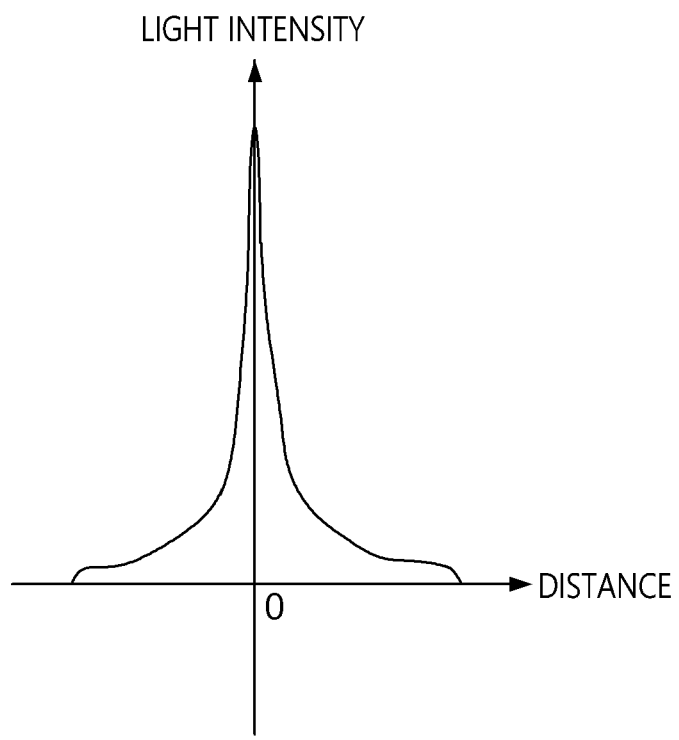

FIG. 2 is a diagram illustrating a light output unit according to an exemplary embodiment, FIG. 3 shows diagrams illustrating one surface of an object in FIG. 2, and FIGS. 4A and 4B show graphs for describing an effect of light intensity according to a distance of a light output unit according to an exemplary embodiment.

Referring to FIG. 2, as described above, light emitted from a light source 112 may pass through a light collection unit 116 to be emitted onto an object O. In addition, the light emitted onto the object O may be in the form of an array spot, and the light collection unit 116 may also be provided with imaging lenses arranged in an array form corresponding to the form. In this case, in the light collection unit 116, an interval d1 of light emitted to each single lens may be different from an interval d2 of light passing through each single lens. Here, intervals of light may be measured in a front area and a rear area, which have the same interval in the light collection unit 116, of the light collection unit 116.

The interval d1 of light emitted to each single lens may be greater than the interval d2 of light passing through each single lens. Due to such a configuration, even when a distance from the light source 112 to the object O is increased, a camera module can easily receive input light. In other words, the camera module according to the exemplary embodiment may easily perform distance measurement event when a distance to the object is long.

Referring to FIG. 3, light passing through the light collection unit 160 may be collected on the object O in the form of an array spot. In an exemplary embodiment, single spots K may be present in various array forms according to the shape of the imaging lens of the light collection unit 160. In an exemplary embodiment, each single spot K may be disposed to be spaced apart from an adjacent spot by a predetermined distance. Due to such a configuration, even when a distance to the object O is increased, pieces of distance information according to distances can be easily distinguished from each other. In other words, the accuracy of distance information can be improved. In addition, the number of spots in the array spot may be variously changed.

Referring to FIGS. 4A and 4B, FIG. 4A shows light intensity when a light collection unit is not present, and FIG. 4B shows light intensity when a light collection unit is present. In this case, when the light collection unit is present and when the light collection unit is not present, light intensity may be greatest at a center 0 of a single spot. However, even though distances to an object are the same, light intensity at the center 0 of the single spot may be different according to the presence or absence of the light collection unit.

More specifically, since light intensity at the center of the single spot is increased by the light collection unit, a magnitude of an electrical signal converted by a sensor may also be increased according to the light intensity. It can be seen that a distance is also increased as a width of an electrical signal in the sensor is increased. Accordingly, the accuracy of distance information according to a distance can be further improved. In addition, since light intensity at the center of the spot is increased by the light collection unit even when a distance to an object is increased, it is possible to compensate for a decrease in light intensity according to the distance to the object.

Figure 5:
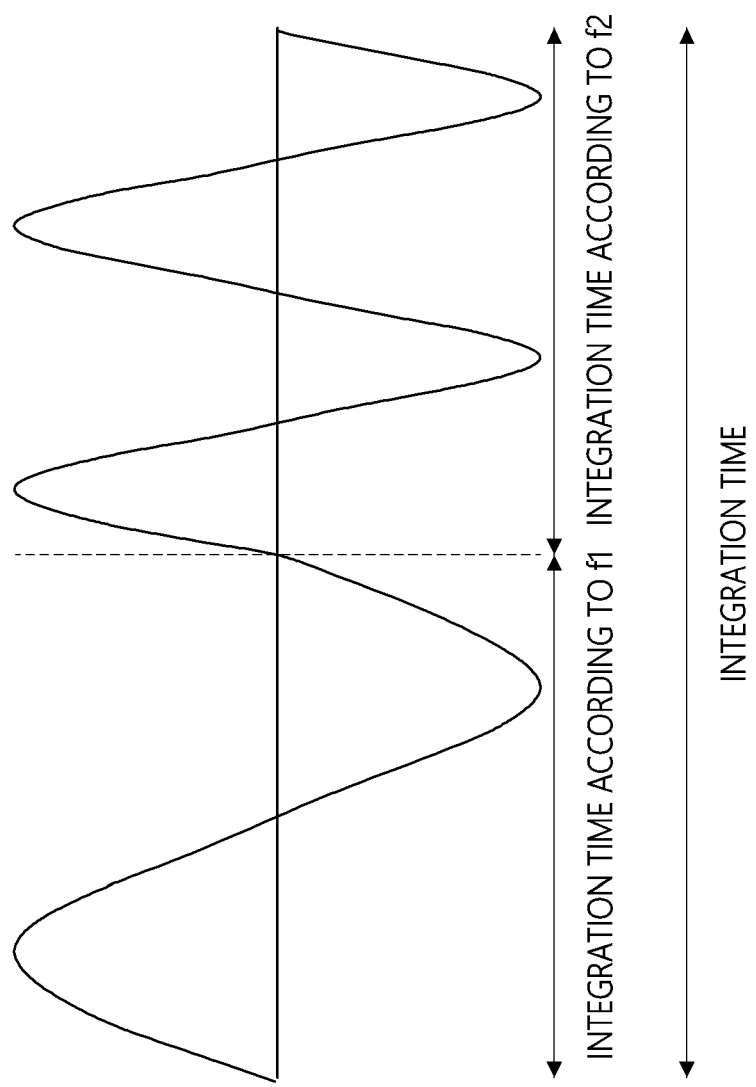
FIG. 5 is a diagram for describing a frequency of an optical signal according to an exemplary embodiment.

FIG. 5 is a diagram for describing a frequency of an optical signal according to an exemplary embodiment.

Referring to FIG. 5, in the exemplary embodiment, as shown in FIG. 5, a light output unit 110 may be controlled to generate an optical signal having a frequency f1 in a first half of an integration time and may be controlled to generate an optical signal having a frequency f2 in the other half of the integration time.

According to another exemplary embodiment, the light output unit 110 may control some LEDs of a plurality of LEDs to generate the optical signal having the frequency f1 and may control the remaining LEDs to generate the optical signal having the frequency f2. As described above, the light output unit 110 may generate output signals having different frequencies for each integration time.

For example, optical signals having the frequencies f1 and f2 may be generated, and a plurality of reference signals may have a phase difference of 90°. In this case, since incident optical signals also have the frequencies f1 and f2, a sensor to be described below may generate four electrical signals through an input optical signal having the frequency f1 and four reference signals corresponding thereto. The sensor may generate four electrical signals through an input optical signal having the frequency of f2 and four reference signals corresponding thereto. Thus, the sensor may generate a total of eight electrical signals. However, as described above, an optical signal may be generated with one frequency (for example, f1).

Figure 6:
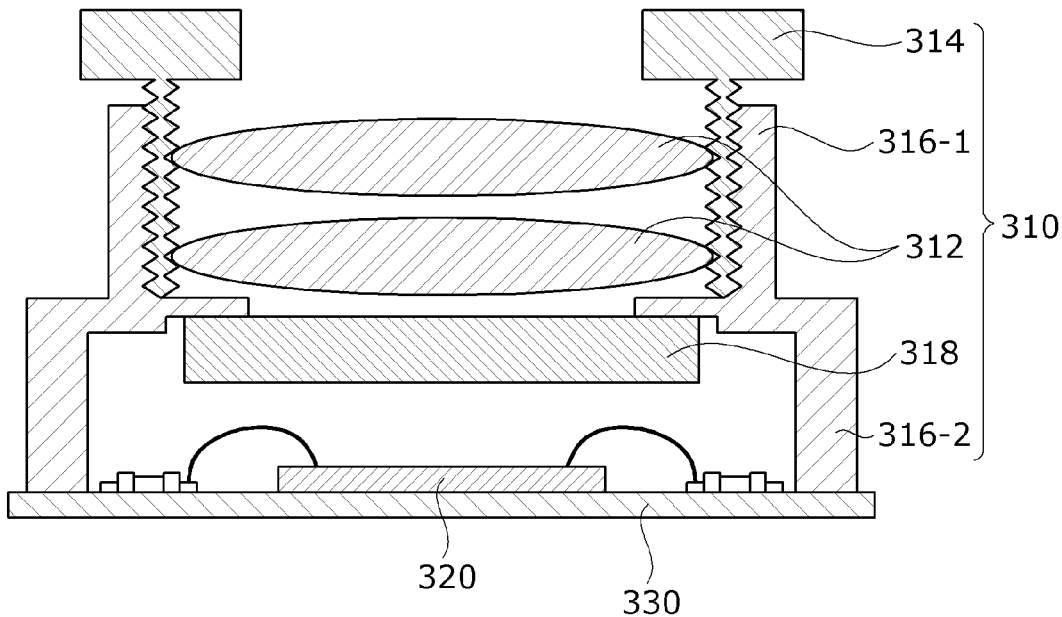
FIG. 6 is a cross-sectional view of a camera module according to an exemplary embodiment.

FIG. 6 is a cross-sectional view of a camera module according to an exemplary embodiment.

Referring to FIG. 6, the camera module according to the exemplary embodiment may include a lens assembly 310, a sensor 320, and a printed circuit board 330. Here, the lens assembly 310 may correspond to the optical unit 120 of FIG. 1, and the sensor 320 may correspond to the sensor 130 of FIG. 1. The control unit 140 of FIG. 1 may be implemented on the printed circuit board 330 or the sensor 320. Although not shown, the light output unit 110 of FIG. 1 may be disposed on the printed circuit board 330 or may be disposed as a separate component. The light output unit 110 may be controlled by the control unit 140.

The lens assembly 310 may include a lens 312, a lens barrel 314, a lens holder 316, and an IR filter 318.

The lens 312 may be provided as a plurality of lens or may be provided as one lens. When the lens 312 is provided as the plurality of lenses, respective lenses may be arranged with respect to a central axis thereof to form an optical system. Here, the central axis may be the same as an optical axis of the optical system. The lens 312 may include the above-described variable lens.

The lens barrel 314 is coupled to the lens holder 316, and a space for accommodating the lens may be formed therein. Although the lens barrel 314 may be rotatably coupled to the one lens or the plurality of lenses, this is merely an example, and the lens barrel 314 may be coupled through another method such as a method using an adhesive (for example, an adhesive resin such as an epoxy).

The lens holder 316 may be coupled to the lens barrel 314 to support the lens barrel 314 and may be disposed on the printed circuit board 330 on which the sensor 320 is mounted. A space in which the IR filter 318 may be disposed may be formed in the lens barrel 314 due to the lens holder 316. Although not shown, a driver capable of tilting or shifting the IR filter 318 under control of the control unit 140 may be disposed in the lens barrel 314. A spiral pattern may be formed on an inner circumferential surface of the lens holder 316, and the lens holder 316 may be rotatably coupled to the lens barrel 314 in which a spiral pattern is similarly formed on an outer circumferential surface thereof. However, this is merely an example, and the lens holder 316 and the lens barrel 314 may be coupled through an adhesive, or the lens holder 316 and the lens barrel 314 may be integrally formed.

The lens holder 316 may be divided into an upper holder 316-1 coupled to the lens barrel 314 and a lower holder 316-2 disposed on the printed circuit board 330 on which the sensor 320 is mounted. The upper holder 316-1 and the lower holder 316-2 may be integrally formed, may be formed in separate structures that are connected or coupled, or may have structures that are separate and spaced apart from each other. In this case, a diameter of the upper holder 316-1 may be less than a diameter of the lower holder 316-2.

The above example is merely an exemplary embodiment, and the optical unit 120 may be formed in another structure capable of collecting an input optical signal incident to a ToF camera module 100 and transmitting the input optical signal to the sensor 130.

Figure 7A:
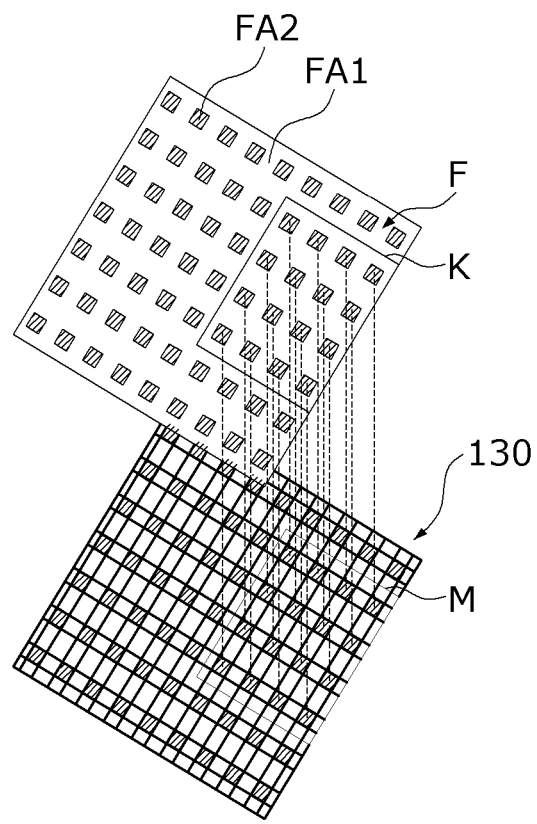
FIG. 7A shows conceptual diagrams of a filter and a sensor according to an exemplary embodiment.
Figure 7B:
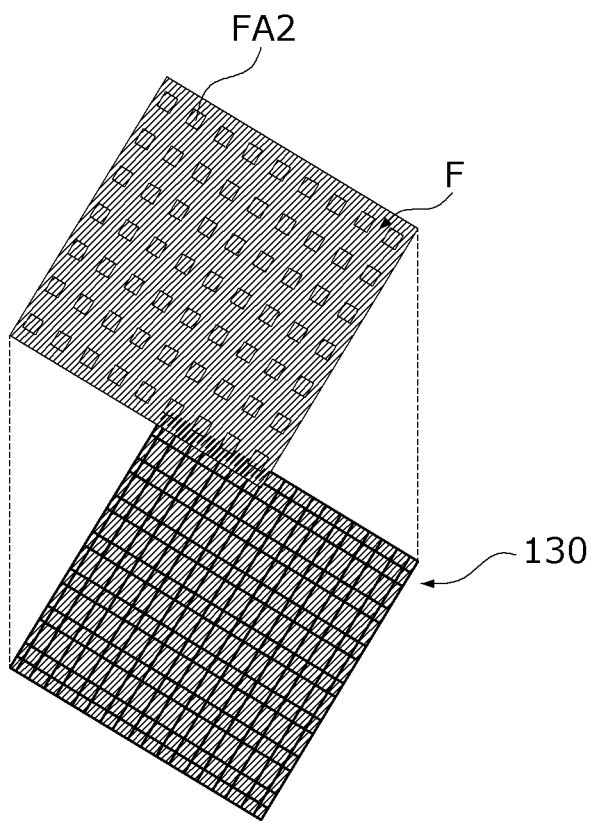
FIG. 7B shows conceptual diagrams of a filter and a sensor according to another exemplary embodiment.
Figure 8:
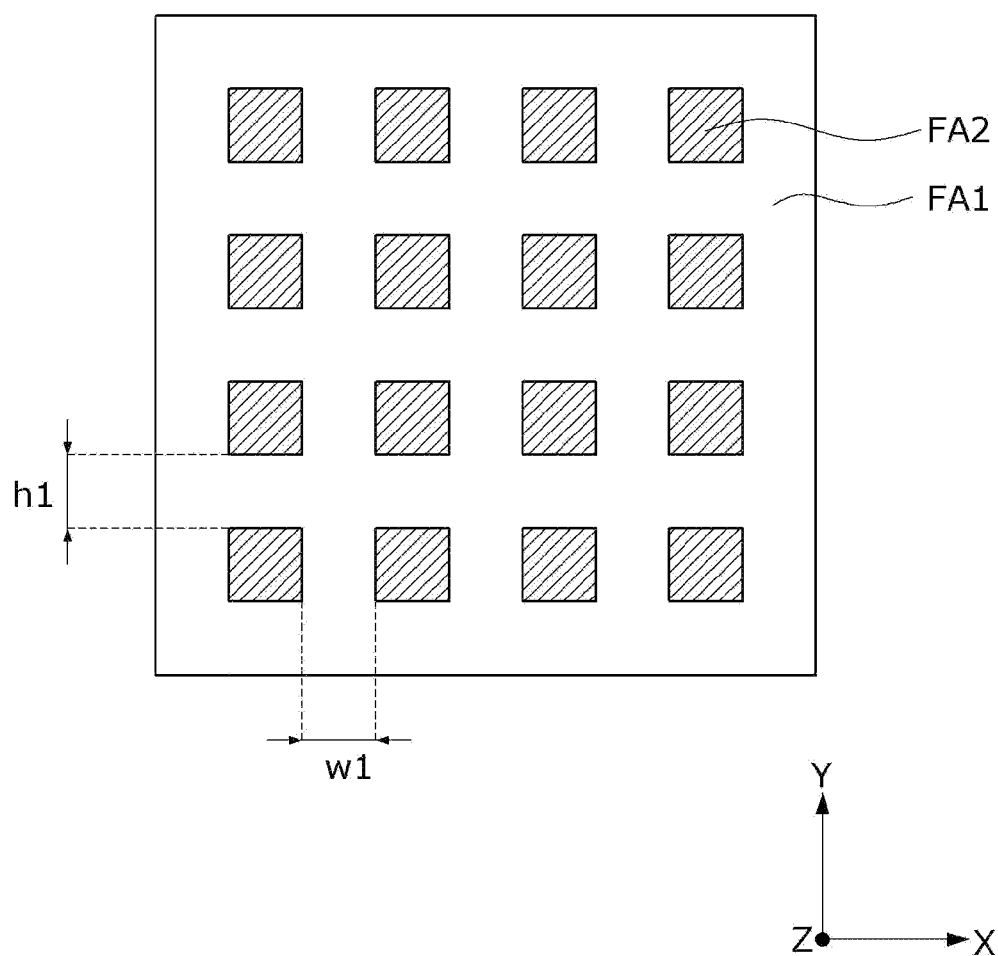
FIG. 8 is an enlarged diagram of portion K in FIG. 7A.
Figure 9:
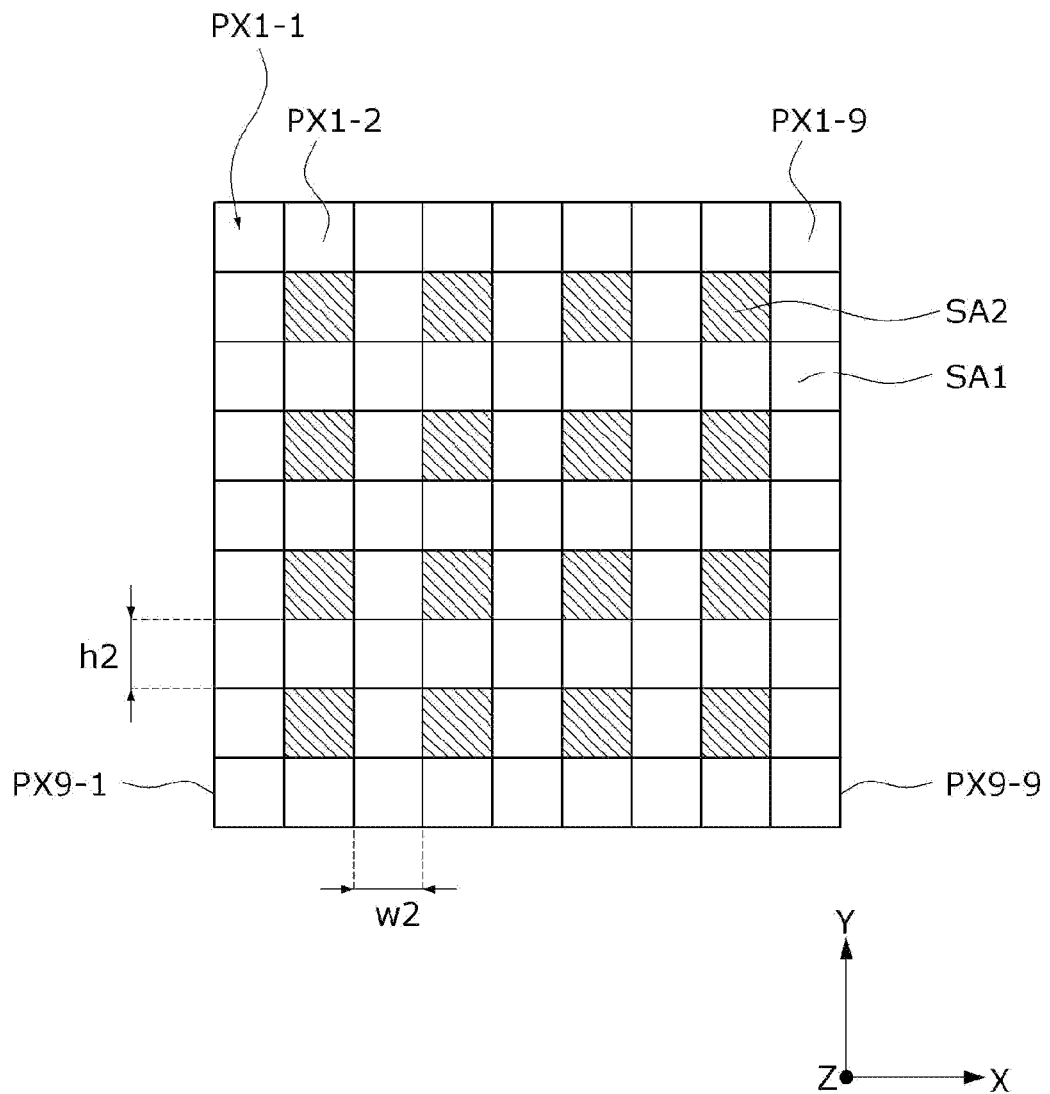
FIG. 9 is an enlarged diagram of portion M in FIG. 7A.
Figure 10:
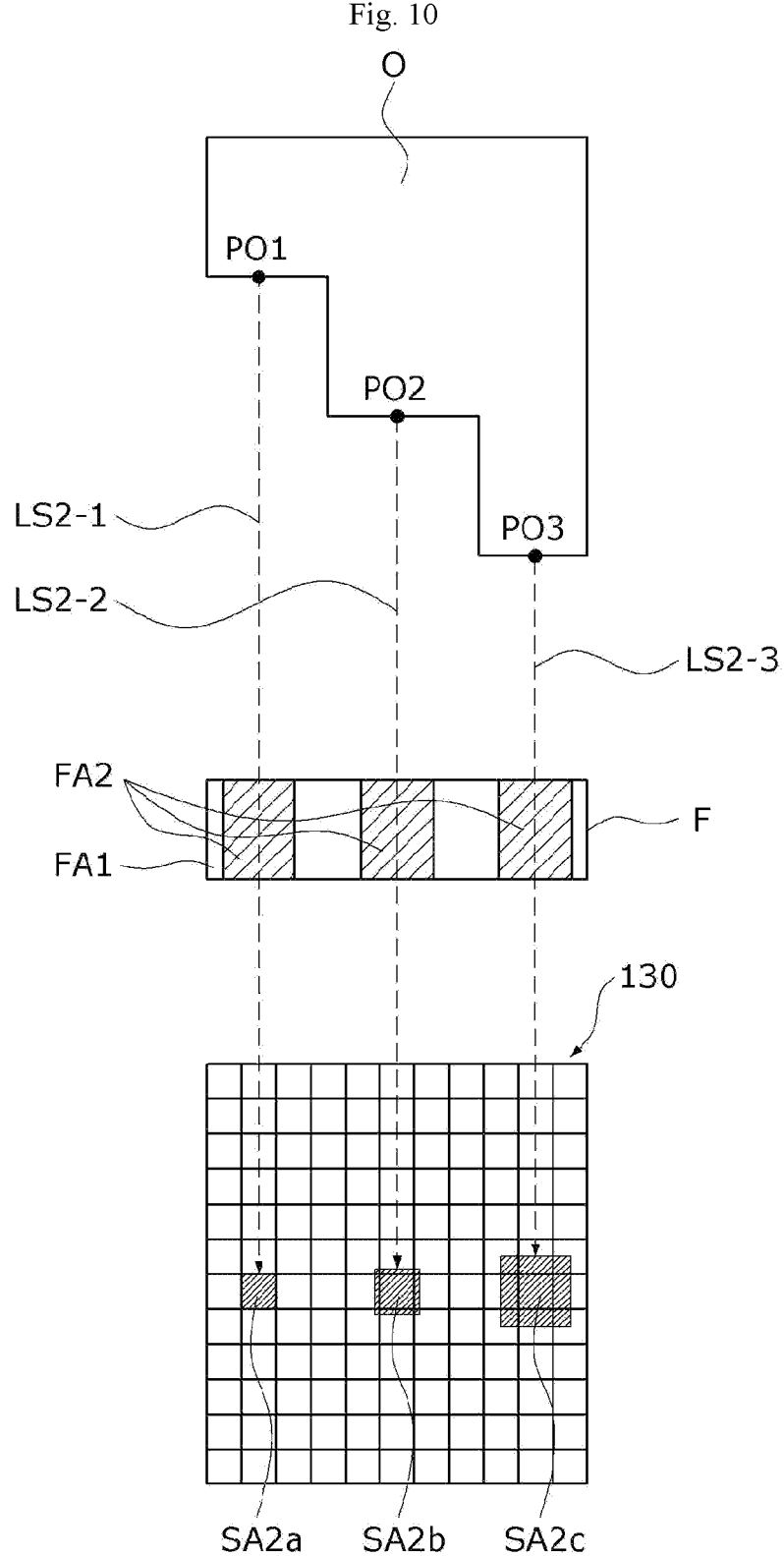
FIG. 10 shows diagrams illustrating a second sensing area of a sensor according to a distance to an object.
Figure 11:
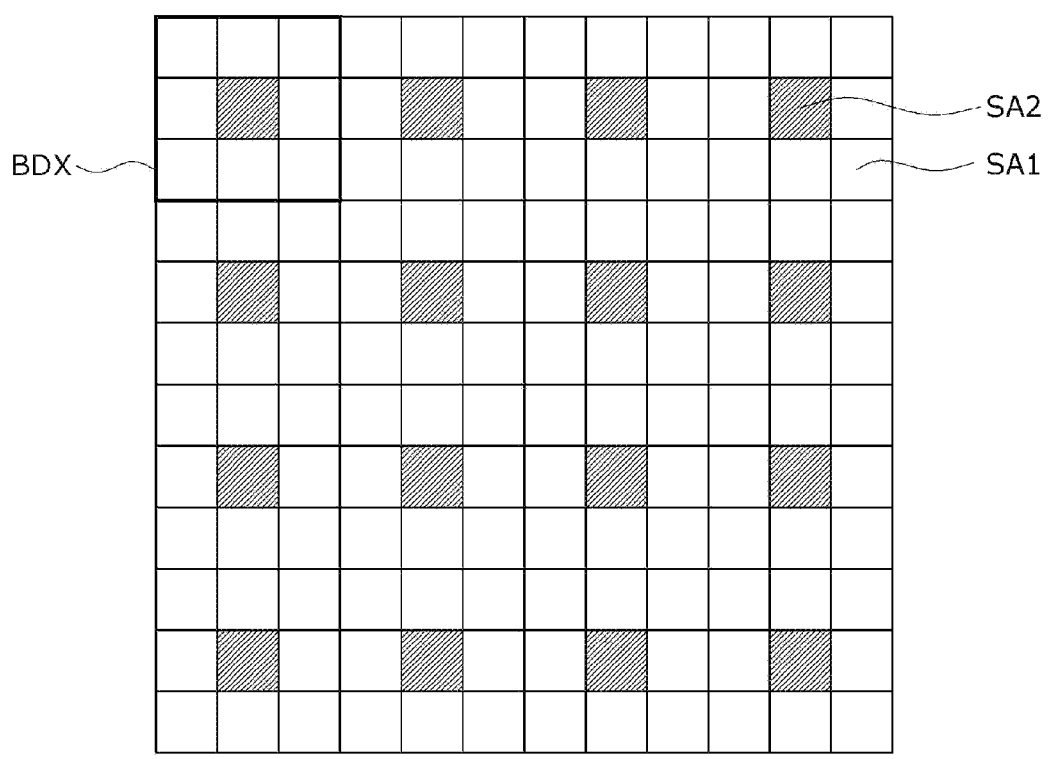
FIG. 11 is a plan view of a sensor according to a modified example.

FIG. 7A shows conceptual diagrams of a filter and a sensor according to an exemplary embodiment, and FIG. 7B shows conceptual diagrams of a filter and a sensor according to another exemplary embodiment. FIG. 8 is an enlarged diagram of portion K in FIG. 7A, and FIG. 9 is an enlarged diagram of portion M in FIG. 7A. FIG. 10 shows diagrams illustrating a second sensing area of a sensor according to a distance to an object. FIG. 11 is a plan view of a sensor according to a modified example.

Referring to FIGS. 7A to 9, reflected light LS2 may pass through a filter F to finally be received by a sensor 130. In this case, the reflected light may be light having a predetermined wavelength band as described above, and a portion of light may be blocked by the filter F.

Specifically, the filter F may include a first filter area FA1 of which a pass band is a first wavelength band and a second filter area FA2 of which a pass band is a second wavelength band which is a band that is different from the first wavelength band. In other words, the filter F may be divided into the first filter area FA1 and the second filter area FA2.

In addition, in an exemplary embodiment, the second wavelength band may be the same as a wavelength band in which IR light is transmitted. Accordingly, since the second filter area F2 filters a wavelength region of IR light, the second filter area F2 may operate as a band pass filter with respect to IR light. On the other hand, the first wavelength band may include the second wavelength band or include a region excluding the second wavelength band. In an exemplary embodiment, the first wavelength band is a pass band which is a wavelength band excluding the second wavelength band, which will be mainly described below.

In this case, the first filter area FA1 may be disposed to surround the second filter area FA2. Specifically, the second filter area FA2 may be provided as a plurality of second filter areas FA2, and the plurality of second filter areas FA2 may be disposed in the filter F so as to be spaced apart from each other. In this case, the second filter areas FA2 may be disposed to be spaced apart from each other by a predetermined interval. For example, widths W1 between adjacent second filter areas FA2 in a first direction (X-axis direction) may all be the same, and also, heights h1 between adjacent second filter areas FA2 in a second direction (Y-axis direction) may all be the same. Here, the first direction (X-axis direction) refers to one direction in which a plurality of pixels arranged in an array form in the sensor are arranged to be parallel, and the second direction (Y-axis direction) is a direction perpendicular to the first direction and refers to a direction in which the plurality of pixels are arranged to be parallel. In addition, a third direction (Z-axis direction) may be a direction perpendicular to both the first direction and the second direction. In addition, descriptions will be provided below based on the first direction (X-axis direction) being a row direction and the second direction (Y-axis direction) being a column direction. In the present specification, the row direction may be used interchangeably with the first direction, and the column direction may be used interchangeably with the second direction.

Due to such a configuration, as will be described below, both distance information and color information may be detected from image data.

In addition, reflected light may pass through the first filter area FA1 and the second filter area FA2 to be received by the sensor 130 thereunder. In this case, an optical signal (reflected light) passing through the first filter area FA1 will be described as a first signal, and an optical signal (reflected light) passing through the second filter area will be described as a second signal.

The sensor 130 may include a first sensing area SA1 for receiving the first signal and a second sensing area SA2 for receiving the second signal. In other words, the sensor 130 may be divided into the first sensing area SA1 and the second sensing area SA2 according to wavelength bands of reflected light passing through the filter F.

First, the first sensing area SA1 may correspond to the first filter area FA1. In other words, the first sensing area SA1 may be an area in which an optical signal passing through the first filter area FA1 arrives at the sensor 130.

Similarly, the second sensing area SA2 may correspond to the second filter area FA2. The second sensing area SA2 may be an area in which an optical signal passing through the second filter area FA2 arrives at the sensor 130.

In addition, since the first sensing area SA1 and the second sensing area SA2 respectively correspond to the first filter area FA1 and the second filter area FA2, the first sensing area SA1 may be disposed to surround the second sensing area SA2.

More specifically, as described above, the sensor 130 may include the plurality of pixels, and the plurality of pixels may be positioned to be parallel in the row direction and the column direction. The second sensing area SA2 may be provided as a plurality of second sensing areas SA2, and the plurality of second sensing areas SA2 may be disposed to be spaced apart from each other.

In addition, each of the second sensing areas SA2 disposed to be spaced apart from each other may be positioned on at least one pixel. Alternatively, each second sensing area SA2 may include at least a partial area of at least one pixel. In an embodiment, each of the second sensing areas SA2 may include a plurality of pixels of which at least portions are disposed to be in contact with each other. In this case, even when a distance between a camera module and an object is varied (for example, when images of various objects disposed different distances are captured), distance information is extracted through the plurality of pixels for each object, thereby improving the accuracy of distance information about a distance to the object.

In addition, according to another exemplary embodiment, the entirety of the filter F may include only the second filter areas FA2, and the sensor 130 may include only the second sensing areas SA2 corresponding thereto (see FIG. 7B). As will be described below, the second sensing areas SA2 may be divided into an extraction area and a non-extraction area. However, hereinafter, descriptions will be provided based on the filter F including both the first filter area FA1 and the second filter area FA2 and the sensor 130 including the first sensing area SA1 and the second sensing area SA2.

In addition, in the sensor 130, a plurality of pixels PX1-1 to PX9-9 may be arranged in the row direction and the column direction. For example, in the sensor 130, the pixels may have nine rows and nine columns. This means that a first-first pixel is positioned in a first row and a first column. In this case, a second-second pixel, a fourth-second pixel, a sixth-second pixel, an eighth-second pixel, a second-fourth pixel, a fourth-fourth pixel, a sixth-fourth pixel, an eighth-fourth pixel, a second-sixth pixel, a fourth-sixth pixel, a sixth-sixth pixel, an eighth-sixth pixel, a second-eighth pixel, a fourth-eighth pixel, a sixth-eighth pixel, and an eighth-eighth pixel may correspond to the second sensing areas SA2.

In this case, each pixel corresponding to the second sensing area SA2 may be surrounded by respective pixels of the first sensing area SA1. For example, the second-second pixel may be disposed to be surrounded by first-first to first-third pixels, a second-first pixel, a second-third pixel, and third-first to third-third pixels. Accordingly, even when a distance to an object is changed, the plurality of second sensing areas SA2 are inhibited from overlapping each other as much as possible, thereby improving the accuracy of distance information.

In addition, the second sensing areas SA2 may be disposed to be spaced apart from each other by a predetermined interval. In an exemplary embodiment, widths W2 between adjacent second sensing areas SA2 in the first direction (X-axis direction) may all be the same. In addition, heights h2 between adjacent second sensing areas SA2 in the second direction (Y-axis direction) may all be the same.

In addition, a width of the first filter area FA1 may be different from a width of the first sensing area SA1. Similarly, a width of the second filter area FA2 may be different from a width of the second sensing area SA2. In an exemplary embodiment, the width of the first filter area FA1 may be greater than the width of the first sensing area SA1, and the width of the second filter area FA2 may be greater than the width of the second sensing area SA2.

Furthermore, the width W1 between adjacent second filter areas FA2 in the first direction may be different from the width W2 between adjacent second sensing areas SA2 in the first direction. In an exemplary embodiment, the width W1 between adjacent second filter areas FA2 in the first direction may be greater than the width W2 between adjacent second sensing areas SA2 in the first direction.

The height h1 between adjacent second filter areas FA2 in the second direction may be different from the height h2 between adjacent second sensing areas SA2 in the second direction. In an exemplary embodiment, the height h1 between adjacent second filter areas FA2 in the second direction may be greater than the height h2 between adjacent second sensing areas SA2 in the second direction. Due to such a configuration, the camera module can provide image data having a wider viewing angle through the plurality of pixels of the sensor.

In addition, the second sensing area SA2 may include a plurality of pixels and may include the extraction area and the non-extraction area as described above. The extraction area is an area in which a phase difference is extracted, and the non-extraction area is an area in which a phase difference is not extracted. The phase difference is a phase difference between an optical signal (incident light) output from a light output unit and an optical signal (reflected light) reflected to the sensor. According to an exemplary embodiment, the non-extraction area may be an area in which two or more electrical signals corresponding to a plurality of reference signals are not generated. The extraction area may be an area in which three or more electrical signals corresponding to a plurality of reference signals are generated. A detailed description thereof will be provided below.

In addition, according to another exemplary embodiment, the non-extraction area may be an area in which the sums of electrical signals corresponding to reference signals having a phase different of 180° are different among a plurality of electrical signals, and the extraction area may be an area in which the sums of electrical signals corresponding to reference signals having a phase different of 180° are the same among a plurality of electrical signals. A control unit may not transmit a switching control signal for controlling a light reception time to pixels positioned in the non-extraction area of the sensor to inhibit the sensor from receiving light in an integration time according to a reference signal. That is, timing control of the pixels in the non-extraction area may be stopped.

According to still another exemplary embodiment, in the non-extraction area, a plurality of electrical signals may have a magnitude that is less than or equal to a preset magnitude. In the extraction area, a plurality of electrical signals may have a magnitude than is greater than the preset size and is less than a maximum magnitude measurable by a light-receiving unit. In this case, when an electric signal has a magnitude that is greater than the maximum magnitude measurable by the light-receiving unit, storage capacitance of a capacitor is exceeded. Thus, pixels may belong to the non-extraction area similarly to the above-described exemplary embodiment or another exemplary embodiment. The above-described exemplary embodiments will be described in detail below.

Referring to FIG. 10, a width of a second sensing area may be changed according to a distance to an object O. As an example, the object O may include a first point PO1, a second point PO2, and a third point PO3 which have different distances from a camera module. The first point PO1 may have a longer distance from the camera module than the second point PO2 and the third point PO3. The third point PO3 may have a shorter distance from the camera module than the first point PO1 and the second point PO2.

In this case, a phase delay of reflected light may be different according to distances to the object. For example, reflected light may include first reflected light LS2-1 that is an optical signal reflected from the first point PO1, second reflected light LS2-2 that is an optical signal reflected from the second point PO2, and third reflected light LS2-3 that is an optical signal reflected from the third point PO3.

The first reflected light LS2-1, the second reflected light LS2-2, and the third reflected light LS2-3 may pass through second filter areas FA2 to be received in second sensing areas SA2 of a sensor 130.

In this case, the second sensing areas SA2 may include a second-first sensing area SA2a for receiving the first reflected light LS2-1, a second-second sensing area SA2b for receiving the second reflected light LS2-2, and a second-third sensing area SA2c for receiving the third reflected light LS2-3.

A width of the second-first sensing area SA2a may be less than a width of the second-second sensing area SA2b and a width of the second-third sensing area SA2c. The width of the second-second sensing area SA2b may be greater than the width of the second-first sensing area SA2a and may be less than the width of the second-third sensing area SA2c. The width of the second-third sensing area SA2c may be greater than the width of the second-first sensing area SA2a and the width of the second-second sensing area SA2b. That is, the widths of the second sensing areas may be different according to distances between the object O and the camera module.

In addition, when the second-first sensing area SA2a corresponds to one pixel, the second-second sensing area SA2b and the second-third sensing area SA2c may correspond to a plurality of pixels. Accordingly, since the plurality of second sensing areas SA2 may be disposed to be spaced apart from each other, the second sensing areas SA2 may be disposed to be spaced apart from each other and may not overlap each other in a row direction or a column direction. Accordingly, the camera module according to the exemplary embodiment may calculate distance information reflecting all different distances between the camera module and the object.

Referring to FIG. 11, in a filter, first filter areas may surround a second filter area, and the first filter areas surrounding one second filter area may not overlap each other. In other words, the filter may be provided as a plurality of aggregate filters including the second filter areas and the first filter areas surrounding the second filter area, and the plurality of aggregate filters may not overlap each other in a third direction (Z-axis direction).

In response to such a filter, even in a sensor, first sensing areas SA1 may surround a second sensing area SA2, and the first sensing areas surrounding one second sensing area SA2 may not overlap each other. In addition, the sensor may include aggregate pixels BDX including the second sensing areas SA2 and the first sensing areas SA1 surrounding the second sensing area SA2. In this case, the plurality of aggregate pixels BDX may be provided and may not overlap each other in the third direction (Z-axis direction). Due to such a configuration, even when a distance to an object is changed, accurate distance measurement may be possible.

Figure 12:
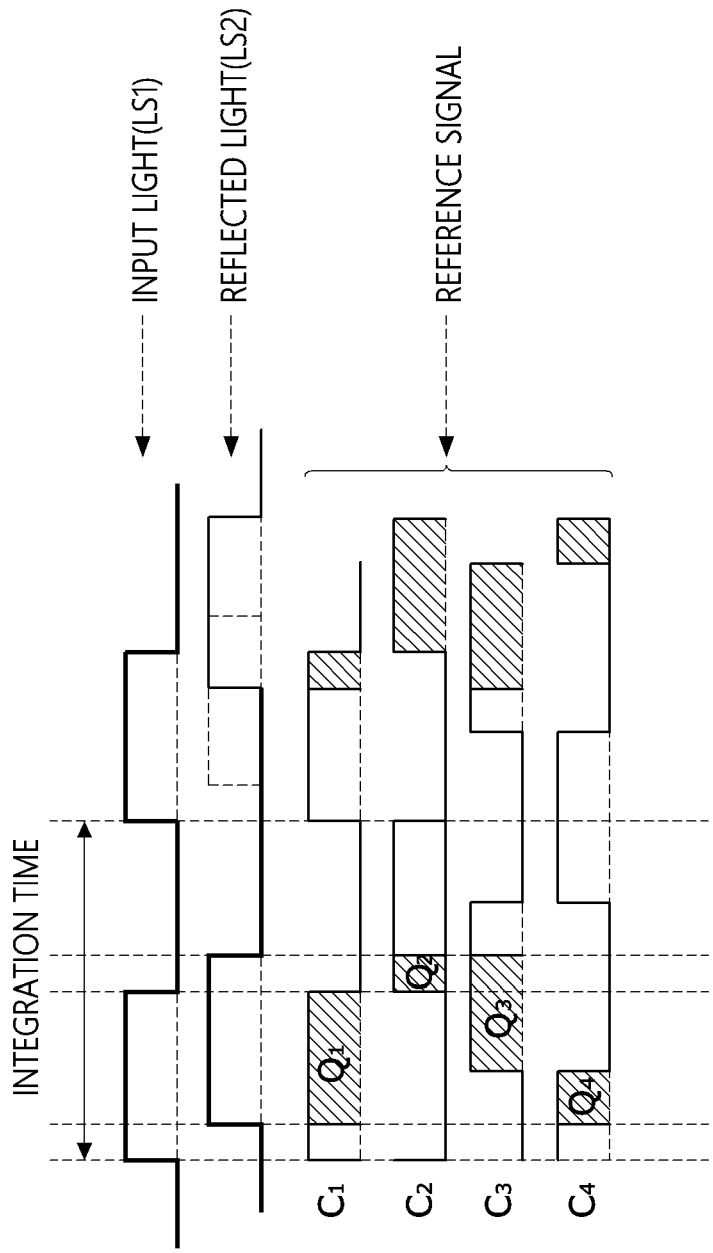
FIG. 12 is a diagram for describing a process of generating an electrical signal in a sensor according to an exemplary embodiment.

FIG. 12 is a diagram for describing a process of generating an electrical signal in a sensor according to an exemplary embodiment.

Referring to FIG. 12, as described above, a phase of reflected light (input light) LS2 may be delayed by as much as a distance by which input light (output light) LS1 is reflected to return after being incident on an object.

In addition, as described above, there may be a plurality of reference signals, and in an exemplary embodiment, as shown in FIG. 12, there may be four reference signals C1 to C4. The reference signals C1 to C4 may each have the same frequency as an optical signal and may mutually have a phase difference of 90°. One signal (for example, C1) of the four reference signals may have the same phase as the optical signal. The reference signals C1 to C4 may be applied to the sensor, and the sensor may generate an electrical signal from the reflected light LS2 according to the reference signal. In an exemplary embodiment, the sensor may include charging elements configured to generate an electrical signal and switching elements, and the switching element may perform an on/off operation according to the reference signal. In other words, in the sensor, an effective area of the sensor may be exposed in response to each reference signal, and the sensor may receive an optical signal during an integration time. That is, when the reference signal is in an on state (positive state), the sensor may be charged with electric charges from the reflected light LS2 to generate an electrical signal. Accordingly, the sensor may generate an electrical signal corresponding to a shaded portion of FIG. 12.

In addition, in this case, the charging elements may include a capacitor and the like, and the switching elements may include various switching elements such as a field effect transistor, but the present invention is not limited to the above-described types.

In another exemplary embodiment, optical signals may be generated at a plurality of frequencies during the integration time. In this case, the sensor absorbs input optical signals at the plurality of frequencies. For example, it is assumed that optical signals are generated at frequencies f1 and f2, and a plurality of reference signals mutually have a phase difference of 90°. Then, since incident optical signals also have the frequencies f1 and f2, four electrical signals may be generated through the input optical signal having the frequency f1 and four reference signals corresponding thereto. Four electrical signals may be generated through the input optical signal having the frequency f2 and four reference signals corresponding thereto. Accordingly, a total of eight electrical signals may be generated. Hereinafter, a case in which an optical signal is generated with one frequency will be described, but as described above, optical signals may be generated with a plurality of frequencies.

Figure 13:
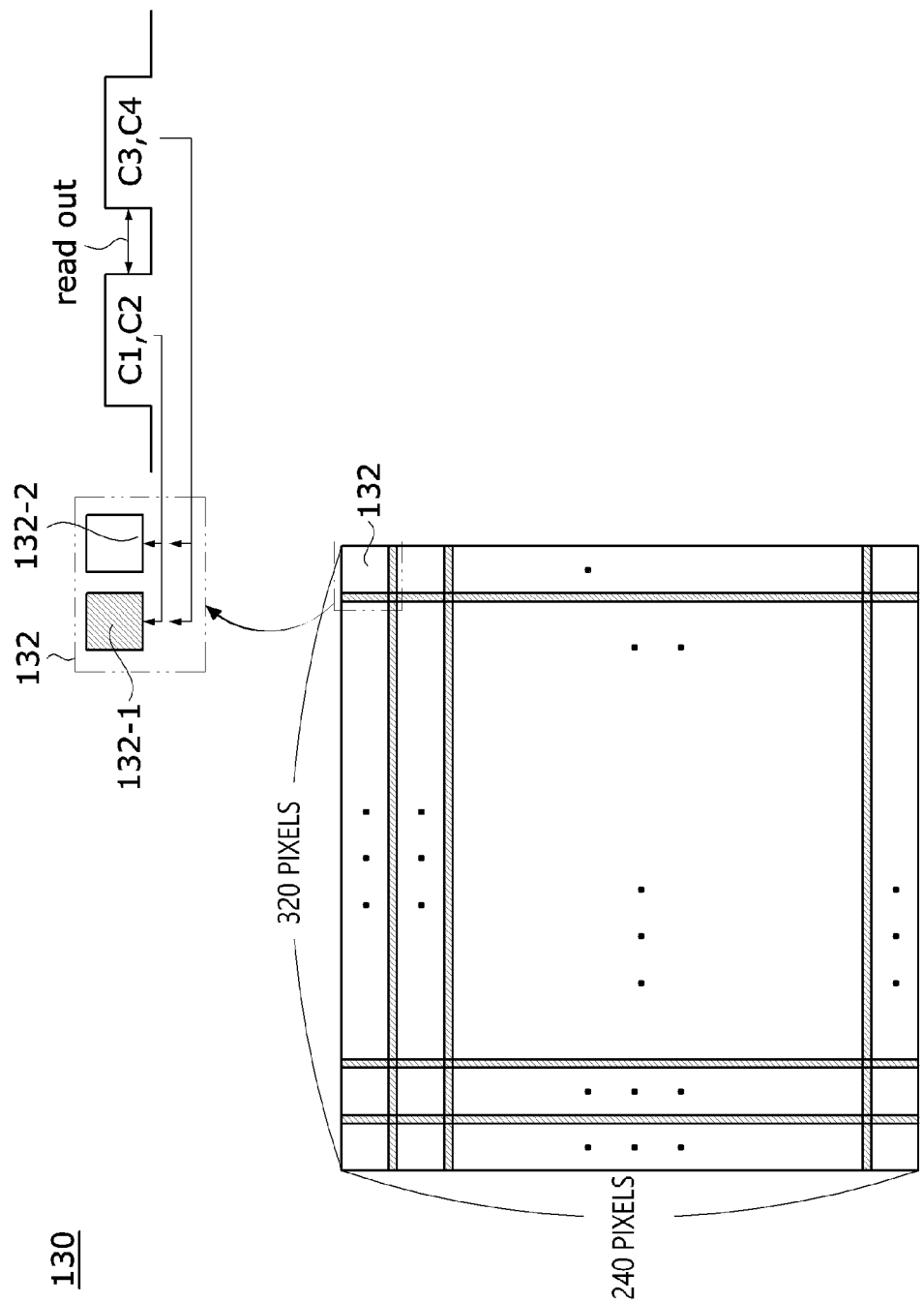
FIG. 13 is a diagram for describing a sensor according to an exemplary embodiment.
Figure 14:
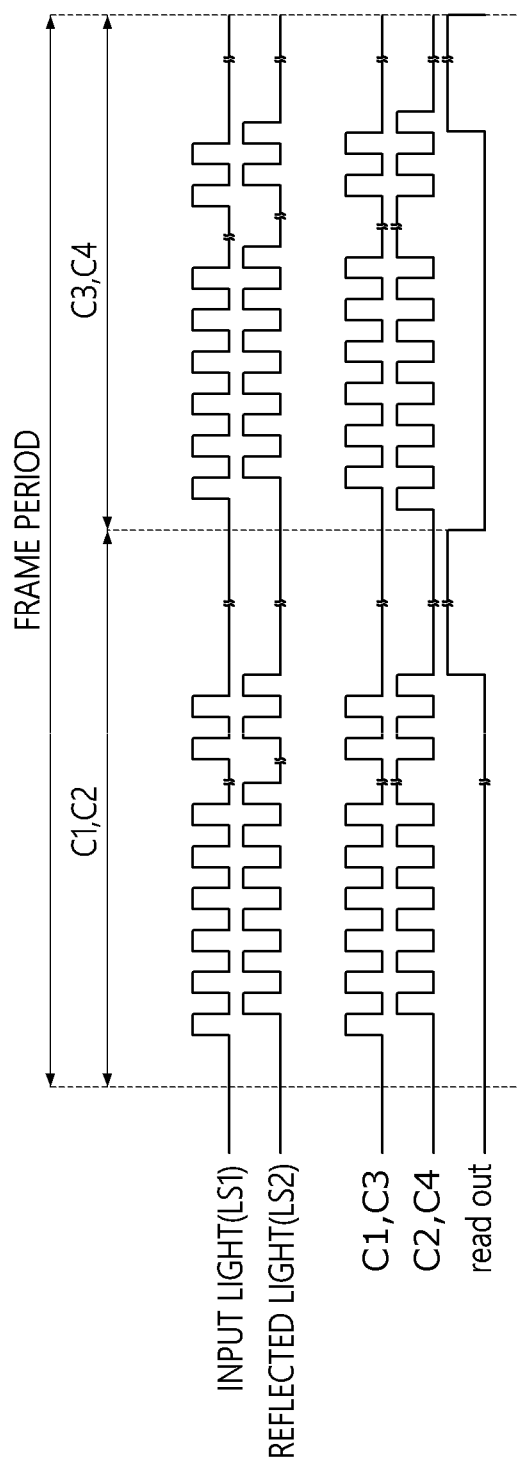
FIG. 14 is a timing diagram of one frame being generated in a sensor according to an exemplary embodiment.

FIG. 13 is a diagram for describing a sensor according to an exemplary embodiment, and FIG. 14 is a timing diagram of one frame being generated in a sensor according to an exemplary embodiment.

First, referring to FIG. 13, as described above, a sensor 130 may include a plurality of pixels and have an array structure. In this case, the sensor 130 may be an active pixel sensor (APS) and may be a complementary metal oxide semiconductor (CMOS) sensor. In addition, the sensor 130 may be a charge coupled device (CCD) sensor. The sensor 130 may include a ToF sensor which receives IR light reflected by a subject to measure a distance using a time difference or a phase difference.

For example, in the sensor 130, the plurality of pixels may be disposed to be parallel in a first direction and a second direction. As an example, the plurality of pixels may be in the form of a matrix. In addition, in an exemplary embodiment, the plurality of pixels may include first pixels P1 and second pixels P2 The first pixel P1 and the second pixel P2 may be alternately disposed in the first direction and the second direction. That is, with respect to one first pixel P1, the plurality of second pixels P2 may be disposed adjacent to each other in the first direction and the second direction. For example, in the sensor 130, the first pixel and the second pixel may be disposed in a checkerboard pattern. That is, as shown in FIG. 13, in the case of the sensor 130 having a resolution of 320x×40, 76,800 pixels may be arranged in a grid form.

In addition, the first pixel P1 and the second pixel P2 may be pixels that receive pieces of light having peak wavelengths in different wavelength bands. For example, the first pixel P1 may receive light having a peak wavelength in an IR band. The second pixel P2 may receive light having a wavelength that is a wavelength out of an IR band. In addition, any one of the first pixel P1 and the second pixel P2 may not receive light.

In an exemplary embodiment, the plurality of pixels may include an effective area, in which a light-receiving element is disposed, and a non-effective area other than the effective area. The effective area may receive light to generate a predetermined electrical signal, and the non-effective area may be an area that receives light to not generate an electrical signal or does not receive light. That is, the non-effective area may have a meaning including a case in which an electrical signal cannot be generated by light even when a light-receiving element is positioned in the non-effective area.

In addition, the first pixel P1 may include the effective area, but the second pixel may include only the non-effective area in which the effective area is not present. For example, a light-receiving element such as a photodiode may be positioned only in the first pixel and may not be positioned in the second pixel. In addition, for example, the sensor 130 may include a plurality of row areas including the effective area and the non-effective area which are alternately arranged in a row direction. Furthermore, in an exemplary embodiment, the sensor 130 may include a plurality of column areas including the effective area and the non-effective area which are alternately disposed in a column direction.

In addition, the plurality of pixels may have various shapes such as a quadrangular shape, a triangular shape, a polygonal shape, and a circular shape Furthermore, the effective area in the pixel may also have various shapes such as a quadrangular shape, a triangular shape, a polygonal shape, and a circular shape.

That is, the plurality of pixels may be disposed to be spaced apart from each other by a certain interval. Such a spacing interval may be much less than a size of the pixel, and a wire or the like may be disposed in the spacing interval. Hereinafter, in the present specification, descriptions will be provided by ignoring the spacing interval.

In addition, in an exemplary embodiment, each pixel 132 (for example, the first pixel) may include a first light-receiving unit 132-1 including a first photodiode and a first transistor and a second light-receiving unit 132-2 including a second photodiode and a second transistor.

The first light-receiving unit 132-1 receives an input optical signal having the same phase as a waveform of output light. That is, at a time at which a light source is turned on, the first photodiode is turned on to absorb an input optical signal. At a time at which the light source is turned off, the first photodiode is turned off to stop absorbing the input light. The first photodiode converts the absorbed input optical signal into a current and transmits the current to the first transistor. The first transistor converts the received current into an electric signal and outputs the electric signal.

The second light-receiving unit 132-2 receives an input signal in a phase opposite to a waveform of output light. That is, at a time at which the light source is turned on, the second photodiode is turned off to absorb an input optical signal. At a time at which the light source is turned off, the second photodiode is turned on to stop absorbing input light. The second photodiode converts the absorbed input optical signal into a current and transmits the current to the second transistor. The second transistor converts the received current into an electrical signal.

Therefore, the first light-receiving unit 132-1 may be referred to as an in-phase receiving unit, and the second light-receiving unit 132-2 may be referred to as an out-phase receiving unit. As described above, when the first light-receiving unit 132-1 and the second light-receiving unit 132-2 are activated with a time difference, a difference in amount of received light occurs according to a distance to an object. For example, when an object is right in front of a camera module 100 (that is, when a distance=zero), since a time taken for light to be output from a light output unit 110 and then reflected from the object is zero, an on/off period of the light source is a reception period of light without any change. Accordingly, only the first light-receiving unit 132-1 receives light, and the second light-receiving unit 132-2 does not receive light. As another example, when an object is positioned to be spaced a predetermined distance from the camera module 100, since it takes time for light to be output from the light output unit 110 and then reflected from the object, an on/off period of the light source is different from a reception period of light. Accordingly, a difference occurs between an amount of light received by the first light-receiving unit 132-1 and an amount of light received by the second light-receiving unit 132-2. That is, a distance to an object may be calculated using a difference between an amount of light input to the first light-receiving unit 132-1 and an amount of light input to the second light-receiving unit 132-2. In other words, a control unit 140 calculates a phase difference between output light and input light using an electrical signal received from the sensor 130 and calculates a distance between the object and the camera module 100 using the phase difference.

More specifically, during a first integration time P1, a first reference signal C1 may be provided to the first light-receiving unit 132-1, and a second reference signal C2 may be provided to the second light-receiving unit 132-2. During a second integration time P2, a third reference signal C3 may be provided to the first light-receiving unit 132-1, and a fourth reference signal C4 may be provided to the second light-receiving unit 132-2. The first integration time P1 and the second integration time P2 may constitute one frame period, and a read-out may be present between the first integration time P1 and the second integration time P2. In this case, the read-out is a section in which an amount of electric charge charged in the pixel is discharged. In this case, the first to fourth reference signals C1 to C4 may be signals for controlling the charging of a charging element in the pixel and may be gate signals in a switching element, and the contents described with reference to FIG. 12 may be equally applied thereto. Through such a method, the sensor 130 may output each of electrical signals corresponding to the reference signals in each of the plurality of pixels. A phase difference between incident light and reflected light may be calculated through the reference signal. As described above, four electrical signals may be generated with respect to an optical signal for each one frame period. Accordingly, the control unit 140 may calculate a phase difference $t_d$ between an optical signal and an input optical signal using Equation 1 below.

$$t_d = \arctan\left(\frac{Q_3 - Q_4}{Q_1 - Q_2}\right) \quad \text{[Equation 1]}$$

Here, $Q_1$ to $Q_4$ each denote an amount of charged electric charge of one of four electrical signals. $Q_1$ denotes an amount of electric charge of an electrical signal corresponding to a reference signal having the same phase as the optical signal. $Q_2$ denotes an amount of electric charge of an electrical signal corresponding to a reference signal having a phase delayed from that of the optical signal by 180°. $Q_3$ denotes an amount of electric charge of an electrical signal corresponding to a reference signal having a phase delayed from that of the optical signal by 90°. $Q_4$ denotes an amount of electric charge of an electrical signal corresponding to a reference signal having a phase delayed from that of the optical signal by 270°.

However, integration times required to calculate the phase difference $t_d$ between the optical signal and the input optical signal in one frame period may be variously changed according to the number of the charging elements, the number of the switching elements, and the number of the light-receiving units in the sensor 130. For example, two charging elements may be connected in each light-receiving unit (that is, two light-receiving units include four charging elements). In this case, two reference signals may be provided to each light-receiving unit in one integration time. For example, during the first integration time, the first reference signal and the second reference signal may be provided to the first light-receiving unit, and the third reference signal and the fourth reference signal may be provided to the second light-receiving unit. Thus, an electrical signal corresponding to each reference signal may be generated, and as described above, the control unit may calculate the phase difference $t_d$ between the optical signal and the input optical signal using an amount of charged electric charge of each electrical signal.

In addition, in another exemplary embodiment, four integration times may be present in one frame period, and four reference signals having a phase difference of 90° may be provided to the light-receiving unit. The control unit may calculate the above-described phase difference $t_d$ between the optical signal and the input optical signal using an amount of electric charge of an electrical signal generated during each integration time.

In addition, referring to FIG. 14, one frame period may sequentially include the first integration time and the second integration time. During the first integration time, the sensor 130 may provide the first reference signal C1 and the second reference signal C2 to the first light-receiving unit 132-1 and the second light-receiving unit 132-2, respectively. During the second integration time, the sensor 130 may provide the third reference signal C3 and the fourth reference signal C4 to the first light-receiving unit 132-1 and the second light-receiving unit 132-2. Accordingly, $Q_1$ and $Q_2$ may be generated in the first integration time, and $Q_3$ and $Q_4$ may be generated in the second integration time. Accordingly, the control unit may generate all $Q_1$ to $Q_4$ in one frame and may calculate the phase difference $t_d$ between the optical signal and the input optical signal using amounts of electric charge of generated four electrical signals.

In addition, the control unit 140 may calculate a distance between an object and the camera module 100 using the phase difference $t_d$ between the optical signal and the reflected optical signal. In this case, the control unit 140 may calculate a distance d (see Equation 2) between the object and the camera module 100 using Equation 2 below.

$$d = \frac{c}{2f} \frac{t_d}{2\pi} \quad \text{[Equation 2]}$$

Here, c denotes the speed of light, and f denotes a frequency of output light.

According to an exemplary embodiment, a ToF IR image and a distance (depth) image may be acquired from the camera module 100. Accordingly, the camera module according to the exemplary embodiment of the present invention may be referred to as a ToF camera module or a ToF camera device.

Figure 21:
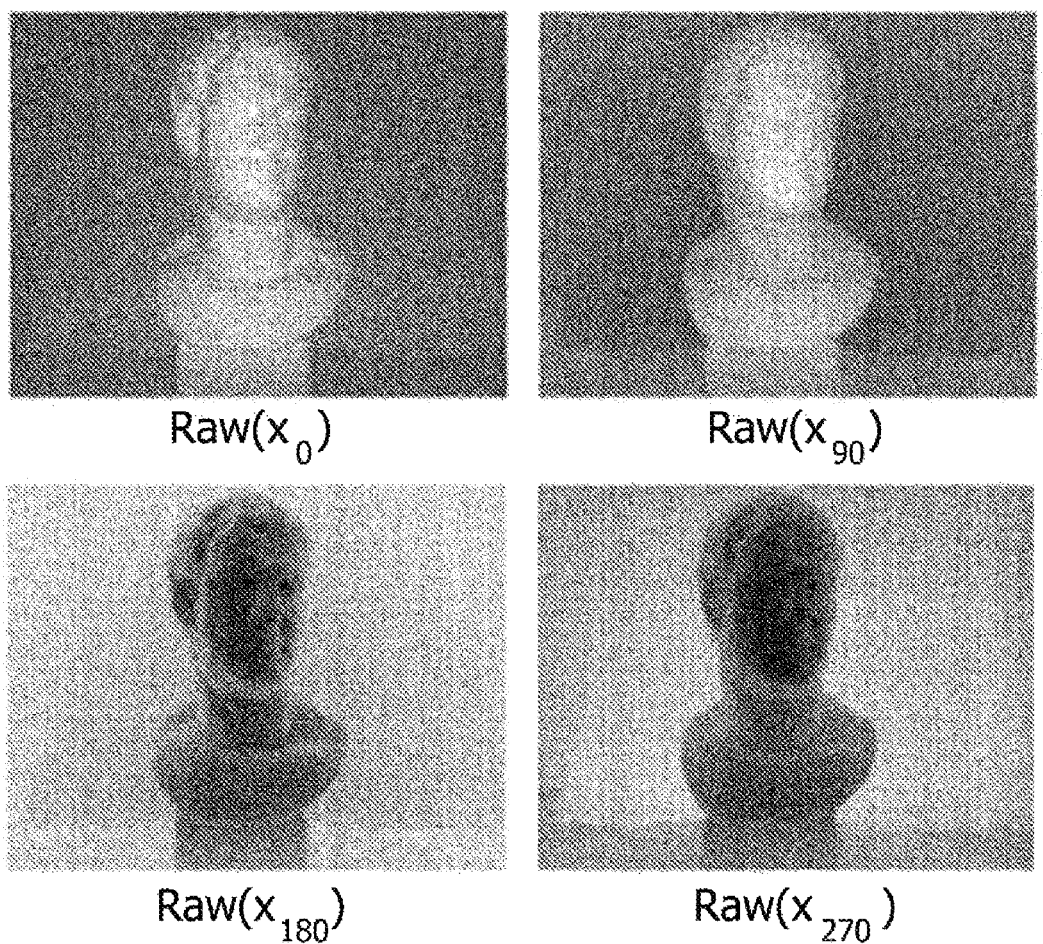
FIG. 21 shows raw images for four phases acquired from a camera module according to an exemplary embodiment.

More specifically, as shown in FIG. 21, the camera module 100 according to the exemplary embodiment may generate raw images for four phases. Here, the four phases may be 0°, 90°, 180°, and 270°, and the raw image for each phase may be an image having a pixel value digitized for each phase or an analog pixel value and may be used interchangeably with a phase image, a phase IR image, and the like. In this case, the raw images for the four phases may be acquired by electrical signals generated from the plurality of pixels, and images shown in FIGS. 21 to 23B may be images acquired for phases when an entire area of the sensor is an extraction area or may be amplitude images or distance images that may be acquired from the images.

The sensor 130 according to the exemplary embodiment may include a non-extraction area in which a phase difference is extracted and an extraction area in which a phase difference is not extracted. Here, the phase difference refers to the phase difference $t_d$ between the optical signal and the input optical signal.

More specifically, the extraction area is an area including a pixel in which amounts of electric charge of electrical signals corresponding to the above-described reference signals are all calculated. On the other hand, according to an exemplary embodiment, the non-extraction area may be an area including a pixel in which two or more electrical signals corresponding to the reference signals are not generated.

That is, the non-extraction area may be an area including a pixel in which electrical signals corresponding to at least two of the first reference signal, the second reference signal, the third reference signal, and the fourth reference signal are not generated.

Accordingly, in the sensor 130 according to the exemplary embodiment, the extraction area may include a pixel corresponding to an area having a very short distance to an object. That is, when a distance to an object is short, an electric signal is not generated from one signal (for example, the second reference signal) of the first reference signal, the second reference signal, the third reference signal, and the fourth reference signal.

In addition, in the sensor 130 according to the exemplary embodiment, the non-extraction area may include a pixel corresponding to an area in which a distance to an object is out of a measurable distance. That is, when a distance to an object is out of the measurable distance, an electric signal is not generated from two or more signals of the first reference signal, the second reference signal, the third reference signal, and the fourth reference signal. Accordingly, for the non-extraction area, the control unit may stop timing control of a received optical signal. Due to such a configuration, since it is difficult to measure a distance for a pixel corresponding to an area having a very long distance from an object, it is possible to block switching control of the switching element of the light-receiving unit from being performed according to the first to fourth reference signals. Accordingly, switching driving is not performed on a pixel for which distance measurement is unnecessary, thereby reducing power consumption to improve the power efficiency of the sensor.

In addition, in the sensor 130 according to another exemplary embodiment, the non-extraction area may include a pixel in which the sums of (amounts of electric charge) of electrical signals corresponding to reference signals having a phase different of 180° are different among a plurality of electrical signals.

Specifically, the total light amount of reflected light LS2 from the sensor 130 may correspond to electrical signals (amounts of electric charge of electrical signals) corresponding to the first reference signal C1 and the second reference signal C2 and may correspond to electrical signals (amounts of electric charge of electrical signals) corresponding to the third reference signal C3 and the fourth reference signal C4. Accordingly, the sum of the electrical signals corresponding to the first reference signal C1 and the second reference signal C2 and the sum of the electrical signals corresponding to the third reference signal C3 and the fourth reference signal C4 should be the same, but when an amount of electric charge that can be charged in the light-receiving unit of the pixel is exceeded due to external light or an object having high reflectance, the above sums may be different from each other. In this case, it may be difficult to accurately measure a phase difference and a distance between an optical signal and an input optical signal in the corresponding pixel. Thus, the sensor 130 according to another exemplary embodiment may block switching control of the switching element of the light-receiving unit from being performed according to the first to fourth reference signals in the non-extraction area including a pixel in which the sums of electrical signals corresponding to reference signals having a phase different of 180° are different among a plurality of electrical signals. Accordingly, switching driving is not performed on a pixel for which distance measurement is unnecessary, thereby reducing power consumption to improve the power efficiency of the sensor.

In the sensor 130 according to another exemplary embodiment, the non-extraction area may include a pixel in which a plurality of electrical signals have a magnitude that is less than or equal to a preset magnitude.

Specifically, as described above, different reference signals may be provided to the light-receiving unit of each pixel in the same integration time, and electric signals may be generated therefrom. In addition, the control unit may provide reference signals to the light-receiving unit of each pixel during a plurality of integration times. As described above, when a magnitude of an electrical signal generated by the light-receiving unit during a frame period is less than or equal to a preset magnitude, a corresponding pixel may be treated as the non-extraction area in consideration of the fact that an amount of reflected light is small and noise caused by external light is present. Accordingly, switching control of the switching element of the light-receiving unit can be inhibited from being performed according to the first to fourth reference signals in the non-extraction area including a pixel in which a plurality of electrical signals have a magnitude that is less than or equal to a preset magnitude. As a result, switching driving is not performed on a pixel for which distance measurement is not accurate, thereby reducing power consumption to improve the power efficiency of the sensor.

Figure 15:
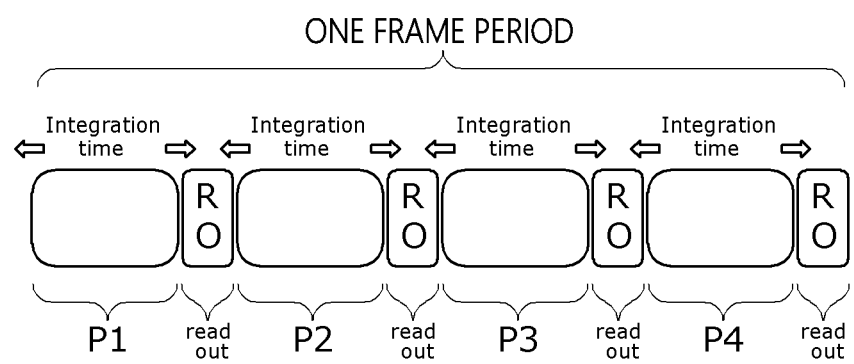
FIG. 15 is a timing diagram of one frame period for generating a distance image in a sensor according to another exemplary embodiment.
Figure 16:
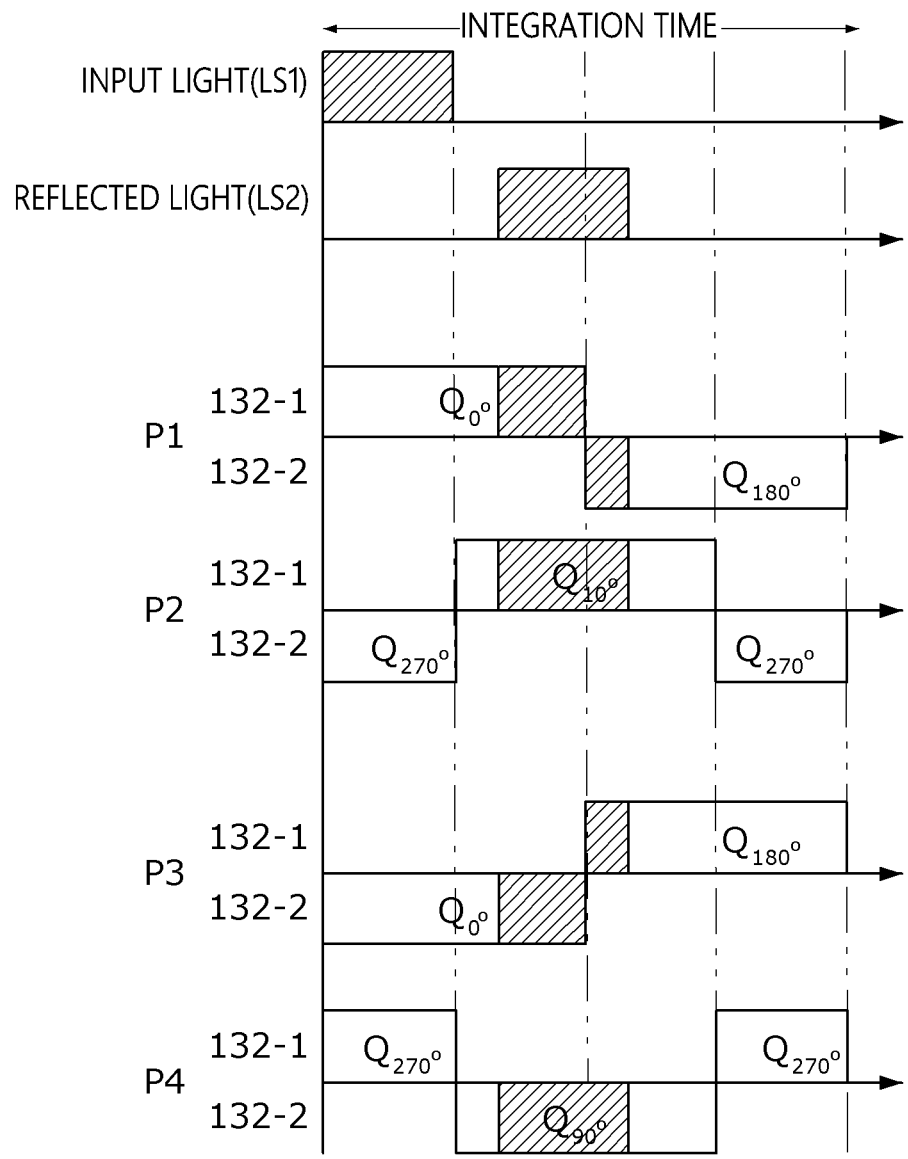
FIG. 16 is a timing diagram of an electrical signal being generated for each integration time within a frame period in FIG. 15.
Figure 17:
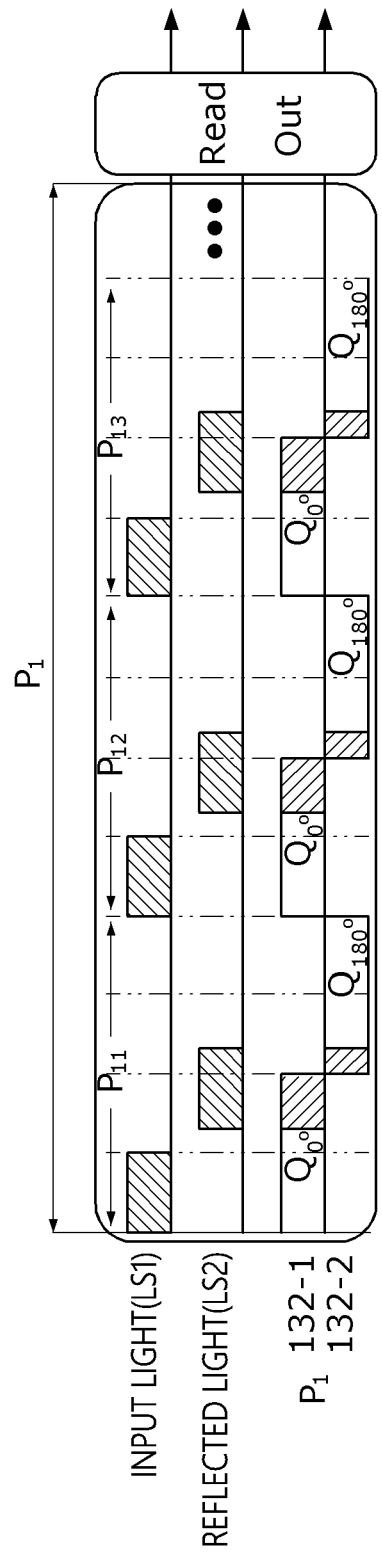
FIG. 17 is a timing diagram in an integration time (P1) in FIG. 15.
Figure 18:
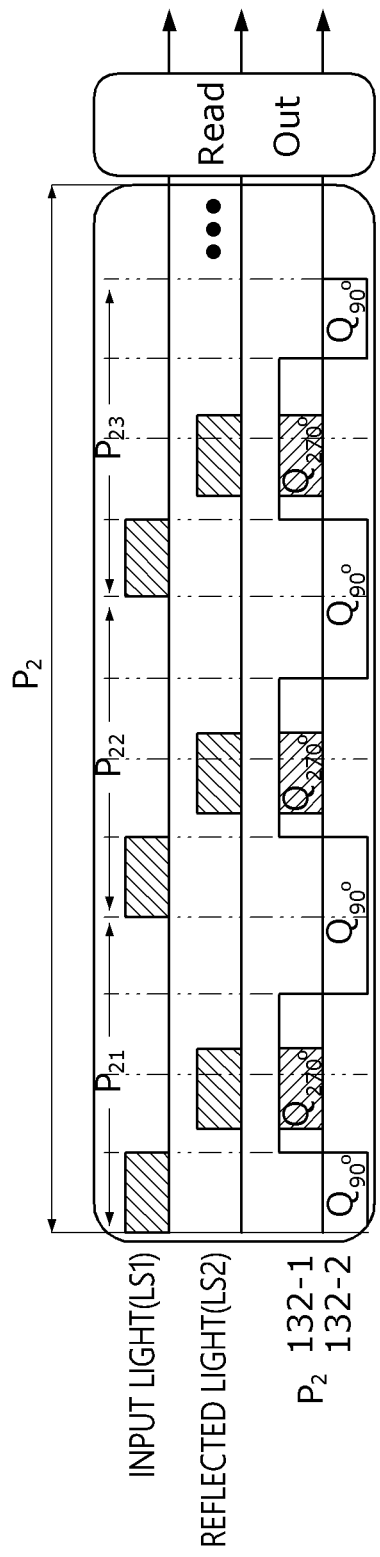
FIG. 18 is a timing diagram in an integration time (P2) in FIG. 15.
Figure 19:
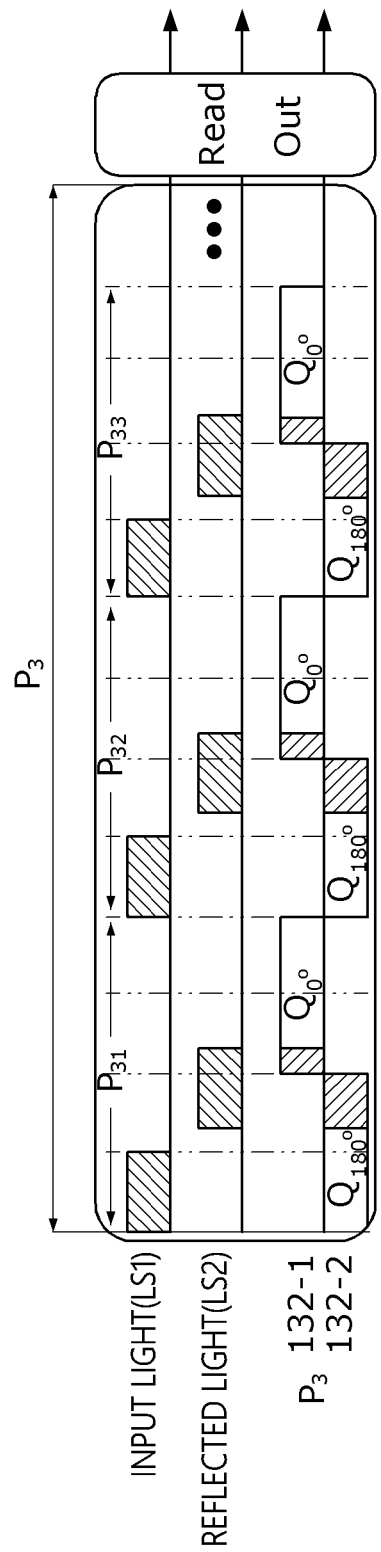
FIG. 19 is a timing diagram in an integration time (P3) in FIG. 15.
Figure 20:
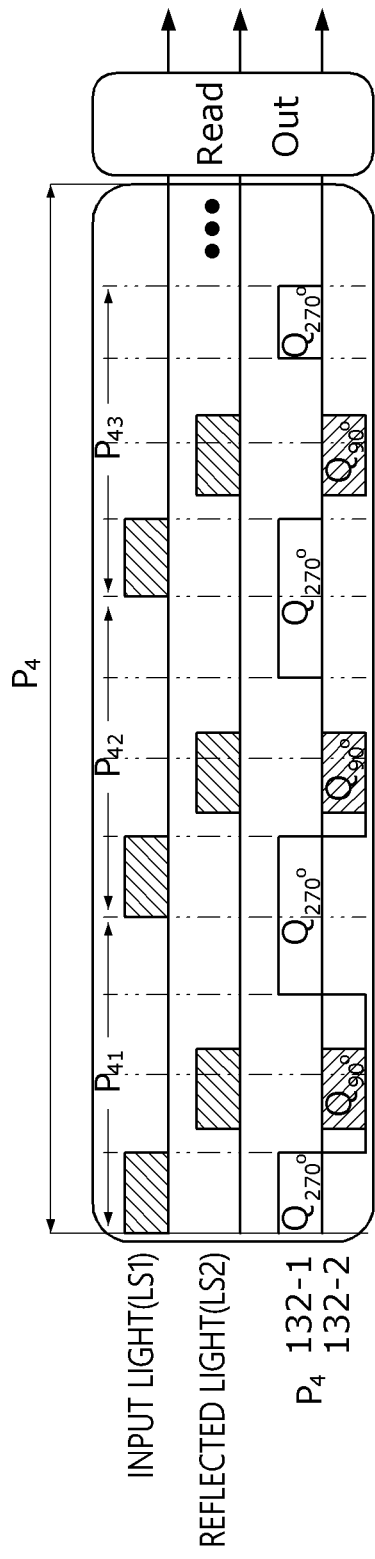
FIG. 20 is a timing diagram in an integration time (P4) in FIG. 15.

FIG. 15 is a timing diagram of one frame period for generating a distance image in a sensor according to another exemplary embodiment. FIG. 16 is a timing diagram of an electrical signal being generated for each integration time within a frame period in FIG. 15. FIG. 17 is a timing diagram in an integration time P1. FIG. 18 is a timing diagram in an integration time P2 in FIG. 15. FIG. 19 is a timing diagram in an integration time P3 in FIG. 15. FIG. 20 is a timing diagram in an integration time P4 in FIG. 15.

Referring to FIG. 15, there may be four integration times and four read-outs during one frame period for which a distance image can be extracted in the sensor according to another exemplary embodiment. However, as described above, the number of the integration times and the number of the read-outs may be variously changed according to the number of light-receiving units and the numbers of charging elements and switching. In addition, in FIGS. 15 to 20, descriptions will be provided by setting a duty ratio of incident light LS1 to 25%. However, the present invention is not limited thereto, and the duty ratio of the incident light may be variously changed.

One frame period may include a first integration time P1, a second integration time P2, a third integration time P3, and a fourth integration time P4 which proceed sequentially. A read-out may be performed between the integration times. The above-described contents may be equally applied thereto. In addition, each integration time may be the same as a period of the incident light LS1.

Referring to FIG. 16, for each integration time, each pixel may generate electrical signals for different phases. That is, different reference signals may be applied. Specifically, it will be described below that one pixel includes a first light-receiving unit 132-1 and a second light-receiving unit 132-2. In the first integration time P1, a first reference signal (corresponding to the above-described C1) having the same phase as the incident light LS1 may be applied to the first light-receiving unit 132-1, and a second reference signal (corresponding to the above-described C2), which has a phase delayed from a phase of the first reference signal by 180°, may be applied to the second light-receiving unit 132-2. In the second integration time P2, a third reference signal (corresponding to the above-described C3), which has a phase delayed from a phase of the first reference signal C1 by 90°, may be applied to the first light-receiving unit 132-4, and a fourth reference signal (corresponding to the above-described C4), which has a phase delayed from a phase of the second reference signal by 180°, may be applied to the second light-receiving unit 132-2. In addition, in the third integration time P3, the second reference signal C2 may be applied to the first light-receiving unit 132-1, and the first reference signal C1 may be applied to the second light-receiving unit 132-2. In the fourth integration time P4, the fourth reference signal C4 may be applied to the first light-receiving unit 132-1, and the third reference signal C3 may be applied to the second light-receiving unit 132-2.

Accordingly, in the first integration time P1, the first light-receiving unit 132-1 may generate an amount of electric charge $Q_{0°}$ corresponding to the above-described amount of electric charge $Q_1$, and the second light-receiving unit 132-2 may generate an amount of electric charge $Q_{180°}$ corresponding to the described amount of electric charge $Q_2$. In the second integration time P2, the first light-receiving unit 132-1 may generate an amount of electric charge $Q_{90°}$ corresponding to the above-described amount of electric charge $Q_3$, and the second light-receiving unit 132-2 may generate an amount of electric charge $Q_{270°}$ corresponding to the above-described amount of electric charge $Q_4$. In addition, in the third integration time P3, the first light-receiving unit 132-1 may generate the amount of electric charge $Q_{180°}$, and the second light-receiving unit 132-2 may generate the amount of electric charge $Q_{0°}$. In the fourth integration time P4, the first light-receiving unit 132-1 may generate the amount of electric charge $Q_{270°}$, and the second light-receiving unit 132-2 may generate the amount of electric charge $Q_{90°}$.

According to an exemplary embodiment, in each integration time, the pixel may output a difference between electrical signals generated by the first light-receiving unit and the second light-receiving unit. That is, the pixel may output amount of electric charge $Q_{o°}$—amount of electric charge $Q_{180°}$ in the first integration time and may output amount of electric charge $Q_{90°}$—amount of electric charge $Q_{270°}$ in the second integration time.

In this case, a control unit according to an exemplary embodiment may treat a pixel, in which magnitudes of outputs of an integration time, for which inverted phase driving occurs in the sensor, are not the same, as a non-extraction area, thereby blocking switching control from being performed on the corresponding pixel. For example, a pixel, in which an output value of the first integration time P1 and an output value of the third integration time P3 have different magnitudes, may be the non-extraction area, or a pixel, in which an output value of the second integration time P2 and an output value of the fourth integration time P4 have different magnitudes, may be the non-extraction area.

Furthermore, the control unit may also determine a pixel, in which the sum of the output value of the first integration time P1 and the output value of the third integration time P3 is different from the sum of the output value of the second integration time P2 and the output value of the fourth integration time P4, as the non-extraction area, thereby blocking switching control from being performed on the corresponding pixel.

In addition, as described above, the non-extraction area may include a pixel in which the sums of electrical signals corresponding to reference signals having a phase different of 180° are different among a plurality of electrical signals, and the control unit may block switching control from being performed on the pixel of the non-extraction area.

Accordingly, the control unit may not provide a control signal corresponding to the reference signal to the corresponding pixel. Therefore, switching driving is not performed on a pixel for which accurate distance measurement is unnecessary, thereby reducing power consumption to improve the power efficiency of the sensor. In addition, as described above, the duty ratio is set to 25%, thereby further improving power consumption.

Referring to FIGS. 16 to 20, the plurality of integration times P1 to P4 may include a plurality of sub-integration times. For example, the first integration time P1 may include a plurality of sub-integration times P11 to P13, the second integration time P2 may include a plurality of sub-integration times P21 to P23, the third integration time P3 may include a plurality of sub-integration times P31 to P33, and the fourth integration time P4 may include a plurality of sub-integration times P41 to P43. In addition, each sub-integration time may be the same as a period of the incident light LS1. Electrical signals generated by the first light-receiving unit 132-1 and the second light-receiving unit 132-2 in each integration time are the same as those described above with reference to FIG. 15.

In this case, the control unit may process an average of electrical signals obtained through the plurality of sub-integration times into an electrical signal of one integration time. Accordingly, it is possible to further improve the accuracy of an electrical signal with respect to a distance.

Figure 22:
FIG. 22 is an amplitude image acquired from a camera module according to an exemplary embodiment.
Figure 23A:
FIGS. 23A and 23B show distance images acquired from a camera module according to an exemplary embodiment.
Figure 23B:
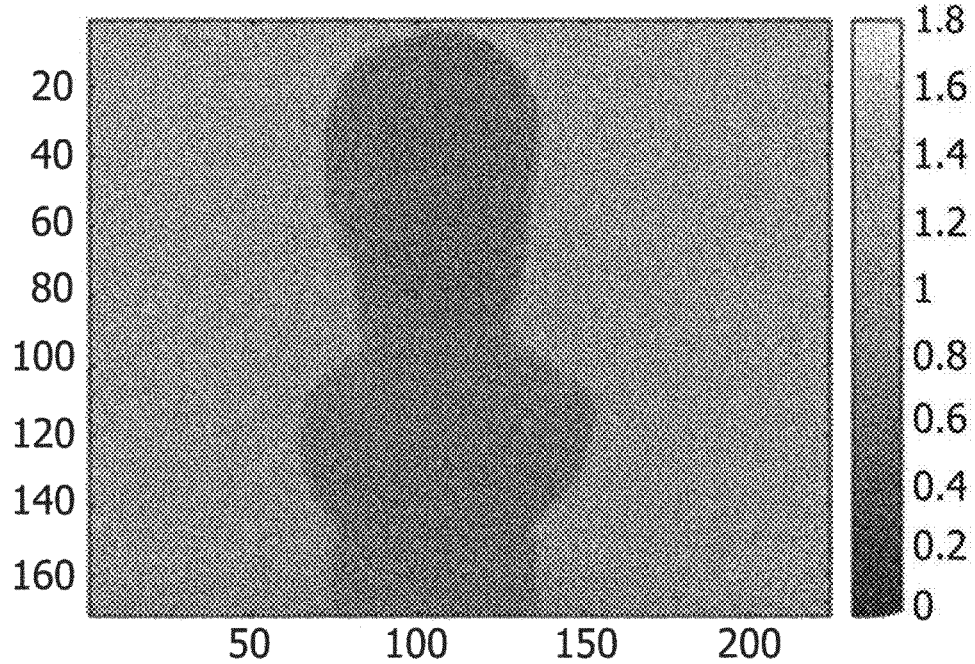

FIG. 21 shows raw images for four phases acquired from a camera module according to an exemplary embodiment, FIG. 22 is an amplitude image acquired from a camera module according to an exemplary embodiment, and FIGS. 23A and 23B are distance images acquired from a camera module according to an exemplary embodiment.

Referring to FIGS. 21 and 22, when calculation is performed as in Equation 3 using four phase images $Raw(X_0)$, $Raw(X_{90})$, $Raw(X_{180})$, and $Raw(X_{270})$ (see FIG. 21), it is possible to acquire an amplitude image (see FIG. 22) which is a ToF IR image.

$$\text{Amplitude} = \frac{1}{2}\sqrt{(Raw(x_{90})^2 - Raw(x_{270}))^2 + (Raw(x_{180}) - Raw(x_0))^2} \quad [\text{Equation 3}]$$

Here, $Raw(X_0)$ may denote a data value for each pixel received in a phase of 0° by a sensor, $Raw(X_{90})$ may denote a data value for each pixel received in a phase of 90° by the sensor, $Raw(X_{180})$ may denote a data value for each pixel received in a phase of 180° by the sensor, and Raw($X_{270}$) may denote a data value for each pixel received in a phase of 270° by the sensor.

Alternatively, when calculation is performed as in Equation 4 using the four phase images of FIG. 21, it is possible to acquire an intensity image which is another ToF IR image.

Intensity=|Raw($x_{90}$)−Raw($x_{270}$)|+|Raw($x_{180}$)−Raw($x_0$)|

Here, Raw($X_0$) may denote a data value for each pixel received in a phase of 0° by the sensor, Raw($X_{90}$) may denote a data value for each pixel received in a phase of 90° by the sensor, Raw($X_{180}$) may denote a data value for each pixel received in a phase of 180° by the sensor, and Raw($X_{270}$) may denote a data value for each pixel received in a phase of 270° by the sensor.

As described above, the ToF IR image may be generated through a process of respectively subtracting two phase images from other two phase images among the four phase images. For example, two phase images of which one phase image is subtracted from another image may mutually have a phase difference of 180°. In the process of respectively extracting two phase images from other two phase, background light may be removed. Accordingly, only a signal in a wavelength band output by a light source remains in the ToF IR image, thereby increasing IR sensitivity with respect to an object and significantly reducing noise.

In the present specification, the ToF IR image may refer to the amplitude image or the intensity image, and the intensity image may be used interchangeably with a confidence image. As shown in FIG. 22, the ToF IR image may be a gray image.

Meanwhile, when calculation is performed as in Equations 5 and 6 using the four phase images of FIG. 21, the distance images of FIGS. 23A and 23B may also be acquired. Equations 5 and 6 may correspond to Equations 1 and 2 described above, respectively.

$$\text{Phase} = \arctan\left(\frac{\text{Raw}(x_{90}) - \text{Raw}(x_{270})}{\text{Raw}(x_{180}) - \text{Raw}(x_0)}\right) \quad [\text{Equation 5}]$$

$$\text{Depth} = \frac{1}{2f} c \frac{\text{Phase}}{2\pi} \quad (c = \text{speed of light}) \quad [\text{Equation 6}]$$

The present invention has been described based on the exemplary embodiments, but the exemplary embodiments are for illustrative purposes and do not limit the present invention, and those skilled in the art will appreciate that various modifications and applications, which are not exemplified in the above description, may be made without departing from the scope of the essential characteristic of the present exemplary embodiments. For example, each component described in detail in the exemplary embodiment can be modified. Further, the differences related to the modification and the application should be construed as being included in the scope of the present invention defined in the appended claims.

The invention claimed is:

1. A camera module comprising:
   a light output unit configured to output a first optical signal to illuminate an object;
   a sensor configured to receive a second optical signal; and
   a control unit configured to acquire distance information of the object using-based on a phase difference of the second optical signal,
   wherein:
   the sensor includes a non-extraction area in which the phase difference is not extracted and an extraction area in which the phase difference is extracted;
   the control unit stops control of the non-extraction area,
   the second optical signal is reflection of the first optical signal from the object,
   the sensor synthesizes the second optical signal with a plurality of reference signals having different phases to generate a plurality of electrical signals,
   in the non-extraction area, two or more of the plurality of electrical signals corresponding to the plurality of reference signals are not generated, and
   in the non-extraction area, sums of electrical signals corresponding to the reference signals having a phase difference of 180° are different among the plurality of electrical signals.

2. The camera module of claim 1, wherein the plurality of reference signals are sequentially shifted by a predetermined phase.

3. The camera module of claim 1, wherein, in the non-extraction area, the plurality of electrical signals have a magnitude that is smaller than or equal to a preset magnitude.

4. The camera module of claim 1, wherein:
   the sensor includes a plurality of pixels;
   the phase difference is a phase difference between the first optical signal and the second optical signal; and
   the control unit blocks switching control for controlling light reception times of the pixels in the non-extraction area.

5. The camera module of claim 1, wherein:
   the sensor includes a first sensing area configured to receive a first signal having a peak wavelength in a first wavelength band, and a second sensing area configured to receive a second signal having a peak wavelength in a second wavelength band; and
   the second wavelength band is different from the first wavelength band.

6. The camera module of claim 5, wherein the second sensing area includes the extraction area and the non-extraction area.

7. The camera module of claim 5, comprising a filter disposed between the object and the sensor,
   wherein the filter includes:
   a first filter area of which a pass band is the first wavelength band; and
   a second filter area of which a pass band is a second wavelength band that is different from the first wavelength band.

8. The camera module of claim 5, wherein:
   the second sensing area is provided as a plurality of second sensing areas; and
   the plurality of second sensing areas are disposed to be spaced apart from each other so as to have a same distance in a row direction or a column direction.

* * * * *